United States Patent
Panchawagh et al.

(10) Patent No.: US 12,471,782 B2
(45) Date of Patent: Nov. 18, 2025

(54) COMPACT PHOTOACOUSTIC SENSOR

(71) Applicant: QUALCOMM Incorporated, San Diego, CA (US)

(72) Inventors: Hrishikesh Vijaykumar Panchawagh, Cupertino, CA (US); Sumit Agrawal, Sunnyvale, CA (US); Bernard Herrera Soukup, Sunnyvale, CA (US); Camilo Perez Saaibi, Dublin, CA (US); Legardo Reyes, Fremont, CA (US); Ila Badge, San Jose, CA (US); Michelle Ma Thin Thin Htay Chan, San Francisco, CA (US); Chin-Jen Tseng, Fremont, CA (US); Ali Lopez, Dublin, CA (US); Nicholas Buchan, San Jose, CA (US); Kostadin Dimitrov Djordjev, Los Gatos, CA (US); John Keith Schneider, Williamsville, NY (US)

(73) Assignee: QUALCOMM Incorporated, San Diego, CA (US)

( * ) Notice: Subject to any disclaimer, the term of this patent is extended or adjusted under 35 U.S.C. 154(b) by 167 days.

(21) Appl. No.: 18/470,755

(22) Filed: Sep. 20, 2023

(65) Prior Publication Data

US 2025/0090030 A1    Mar. 20, 2025

(51) Int. Cl.
*A61B 5/00* (2006.01)
*A61B 5/02* (2006.01)
*A61B 5/021* (2006.01)

(52) U.S. Cl.
CPC ........ *A61B 5/0095* (2013.01); *A61B 5/02007* (2013.01); *A61B 5/02133* (2013.01); *A61B 5/489* (2013.01)

(58) Field of Classification Search
CPC .............. A61B 5/0095; A61B 5/02007; A61B 5/02133; A61B 5/489; A61B 5/7203;
(Continued)

(56) References Cited

U.S. PATENT DOCUMENTS 5,639,508 A * 6/1997 Okawa .................. B41J 2/1612
29/25.35
2007/0093717 A1* 4/2007 Nagar .................... A61B 5/489
600/438
(Continued)

FOREIGN PATENT DOCUMENTS

WO    2024137065 A1    6/2024
WO    2024242779 A1    11/2024

OTHER PUBLICATIONS

International Search Report and Written Opinion—PCT/US2024/046188—ISA/EPO—Feb. 18, 2025.

*Primary Examiner* — Bo Joseph Peng
(74) *Attorney, Agent, or Firm* — QUALCOMM Incorporated

(57) ABSTRACT

Some disclosed examples pertain to an apparatus that can include a platen, a light source system, a receiver system, and an electromagnetic interference (EMI) shield. The light source system can include light source system circuitry, a light-emitting component, and a light guide component having a substantially uniform cross-section. The light-emitting component provides light to an area of the platen via the light guide component. The receiver system can include at least two receiver stack portions residing proximate on either side of the light guide component. The receiver system detects acoustic waves corresponding to a photoacoustic response of a target object proximate the area of the platen, to light emitted by the light source system. The EMI shield shields the receiver system from at least some of
(Continued)

the EMI produced by the light source system circuitry. The light guide component conveys light through a portion of the EMI shield.

28 Claims, 11 Drawing Sheets

(58) Field of Classification Search
CPC ..... A61B 5/1455; A61B 5/14532; A61B 8/56; G01N 21/1702
See application file for complete search history.

(56) References Cited

U.S. PATENT DOCUMENTS

| | | | |
|---|---|---|---|
| 2007/0287912 A1* | 12/2007 | Khuri-Yakub | ..... G01N 29/2431 600/443 |
| 2013/0109947 A1* | 5/2013 | Wood | ..................... A61B 5/021 600/407 |
| 2014/0206978 A1 | 7/2014 | Ackerman et al. | |
| 2015/0075287 A1* | 3/2015 | Herzog | ................. G01H 9/004 73/655 |
| 2015/0265154 A1* | 9/2015 | Huang | ................. A61B 5/0095 600/407 |
| 2018/0146950 A1* | 5/2018 | Ohishi | ..................... A61B 8/13 |
| 2020/0193326 A1* | 6/2020 | Leabman | ............. H01Q 21/061 |
| 2022/0395255 A1* | 12/2022 | Ryan | ................... A61B 5/1079 |

* cited by examiner

COMPACT PHOTOACOUSTIC SENSOR

TECHNICAL FIELD

This disclosure relates generally to photoacoustic devices and more specifically to compact photoacoustic devices.

DESCRIPTION OF RELATED TECHNOLOGY

A variety of different sensing technologies and algorithms are being implemented in devices for various biometric and biomedical applications, including health and wellness monitoring. This push is partly a result of the limitations in the usability of traditional measuring devices for continuous, noninvasive and ambulatory monitoring. Some such devices are, or include, photoacoustic devices. Although some existing photoacoustic devices may be relatively effective, photoacoustic devices having improved features and improved performance would be desirable.

SUMMARY

The systems, methods, and devices of this disclosure each have several aspects, no single one of which is solely responsible for the desirable attributes disclosed herein.

One innovative aspect of the subject matter described in this disclosure can be implemented in an apparatus that includes a platen, a light source system, a receiver system, and an electromagnetic interference (EMI) shield. The light source system can include light source system circuitry, at least a first light-emitting component, and at least a first light guide component. The first light-emitting component is configured to provide light to a first area of the platen via the first light guide component, the first light guide component having a substantially uniform cross-section. The receiver system can include at least two receiver stack portions, a first receiver stack portion residing proximate a first side of the first light guide component and a second receiver stack portion residing proximate a second side of the first light guide component, the receiver system being configured to detect acoustic waves corresponding to a photoacoustic response of a target object proximate the first area of the platen to light emitted by the light source system. The EMI shield is configured to shield the receiver system from at least some of the EMI produced by the light source system circuitry, wherein the first light guide component is configured to transmit light from the first light-emitting component through a first EMI shield portion to the first area of the platen.

Other innovative aspects of the subject matter described in this disclosure can be implemented in a method. The method may involve causing a first light-emitting component to provide light to a first area of a platen via a first light guide component that has a substantially uniform cross-section; detecting, by a receiver system, acoustic waves corresponding to a photoacoustic response of a target object proximate the first area of the platen, to the light emitted by the first light-emitting component; and shielding the receiver system from at least some electromagnetic interference (EMI) produced by light source system circuitry, wherein the first light guide component is configured to transmit light from the first light-emitting component to the first area of the platen through a first EMI shield portion.

Other innovative aspects of the subject matter described in this disclosure can be implemented in an apparatus that includes means for causing a first light-emitting component to provide light to a first area of a platen via a first light guide component that has a substantially uniform cross-section; means for detecting acoustic waves corresponding to a photoacoustic response of a target object proximate the first area of the platen, to the light emitted by the first light-emitting component; and means for shielding a receiver system from at least some electromagnetic interference (EMI) produced by light source system circuitry, wherein the first light guide component is configured to transmit light from the first light-emitting component to the first area of the platen through a first EMI shield portion.

Some or all of the methods described herein may be performed by one or more devices according to instructions (e.g., software) stored on non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon. The software may include instructions for controlling one or more devices to perform one or more disclosed methods.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale. Like reference numbers and designations in the various drawings indicate like elements.

DETAILED DESCRIPTION

Figure 1A:
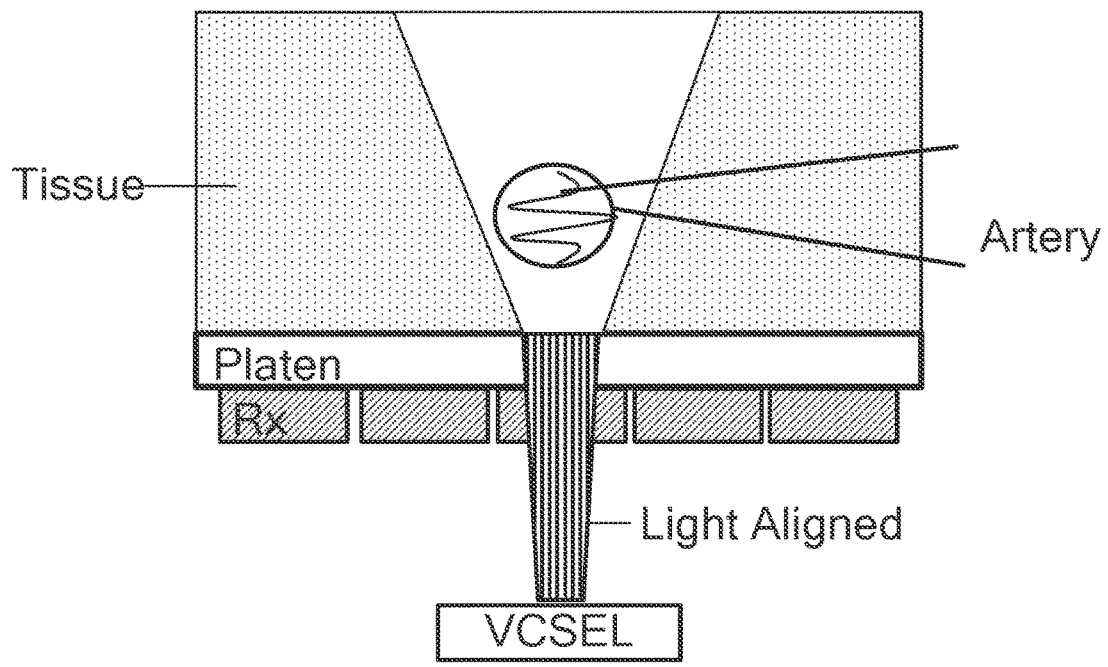
FIG. 1A shows an example of a light source that is properly aligned with an artery.

The following description is directed to certain implementations for the purposes of describing various aspects of this disclosure. However, a person having ordinary skill in the art will readily recognize that the teachings herein can be applied in a multitude of different ways. Some of the concepts and examples provided in this disclosure are especially applicable to blood pressure monitoring applications. However, some implementations also may be applicable to other types of biological sensing applications, as well as to other fluid flow systems. The described implementations may be implemented in any device, apparatus, or system that includes an apparatus as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, handheld or portable computers, netbooks, notebooks, smartbooks, tablets, printers, copiers, scanners, facsimile devices, global positioning system (GPS) receivers/navigators, cameras, digital media players, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), architectural structures, microwaves, refrigerators, stereo systems, cassette recorders or players, DVD players, CD players, VCRs, radios, portable memory chips, washers, dryers, washer/dryers, parking meters, automobile doors, autonomous or semi-autonomous vehicles, drones, Internet of Things (IoT) devices, etc. Thus, the teachings are not intended to be limited to the specific implementations depicted and described with reference to the drawings; rather, the teachings have wide applicability as will be readily apparent to persons having ordinary skill in the art.

Non-invasive health monitoring devices, such as photoacoustic plethysmography (PAPG)-capable devices, have various potential advantages over more invasive health monitoring devices such as cuff-based or catheter-based blood pressure measurement devices. However, it has proven to be difficult to design satisfactory PAPG-capable devices. One challenge is that several existing PAPG devices are relatively bulky. The size of such devices may render the devices uncomfortable to use. Furthermore, the type of components that are used as light sources in existing PAPG devices may be outdated in at least some cases and it would be desirable to take advantage of current enhancements and technological improvements.

Figure 1B:
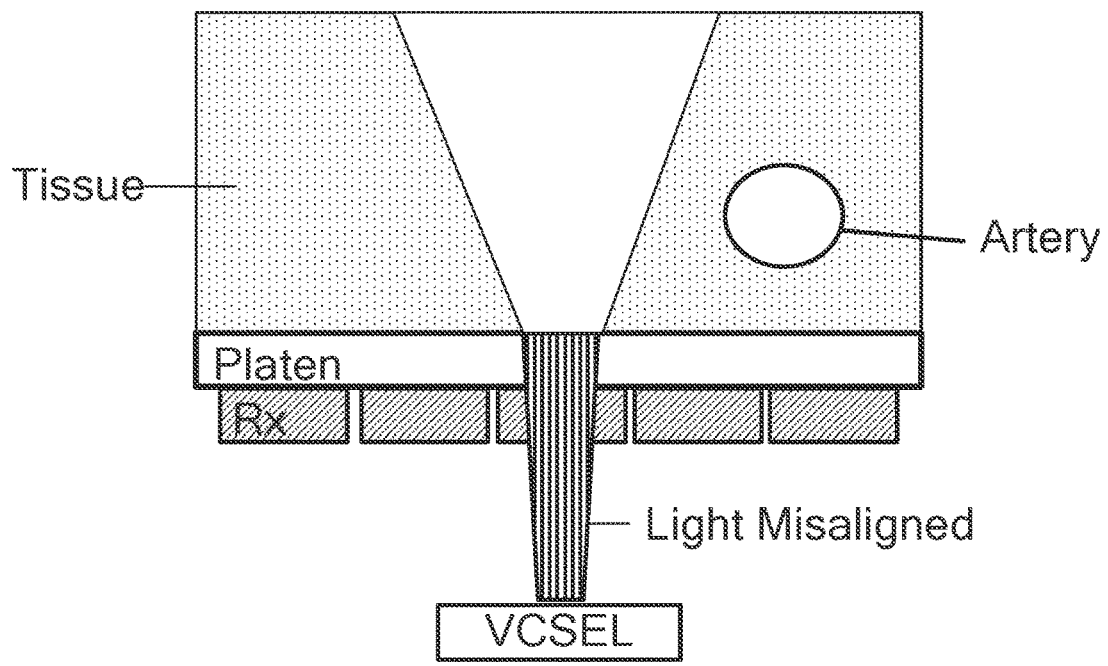
FIG. 1B shows an example of a light source that is not properly aligned with an artery.

Another challenge is that the signal-to-noise ratio (SNR) for signals of interest, such as signals corresponding to ultrasound caused by the photoacoustic response of arterial walls, is low. For example, signals corresponding to arterial walls are generally significantly lower in amplitude than signals corresponding to the photoacoustic response of skin. Furthermore, the orientation of the same artery may vary from user to user and within the body of the same user. These variations in arterial orientation can make it challenging to direct light to an artery. One example of a properly illuminated artery is shown in FIG. 1A, which shows a waveform within the artery representing a photoacoustic response to the light provided by a single vertical-cavity surface-emitting laser (VCSEL). FIG. 1B shows an example in which the light from the light source is misaligned with the artery. Simulations show that even a 1.5 millimeter (mm) misalignment of the light can cause significant degradation of the resulting photoacoustic signal. One solution to possible misalignment would be to use an array of suitable light sources. However, it has proven to be difficult to design satisfactory compact, or semi-compact, PAPG-based devices. Some "semi-compact" devices may have a length in the range of 5.0 mm to 40 mm. Some semi-compact devices may have a cross-sectional area in the range of 6.0 $mm^2$ to 50 $mm^2$. A "compact" device is a device that is smaller than a semi-compact device. For example, some semi-compact devices that have recently been developed by the present assignee to mitigate artifact signals such as electromagnetic interference (EMI) signals, signals from reflected light, and signals from reflected acoustic waves, may be too large to deploy conveniently in a wearable device, such as a watch, a patch or an ear bud.

Figure 2:
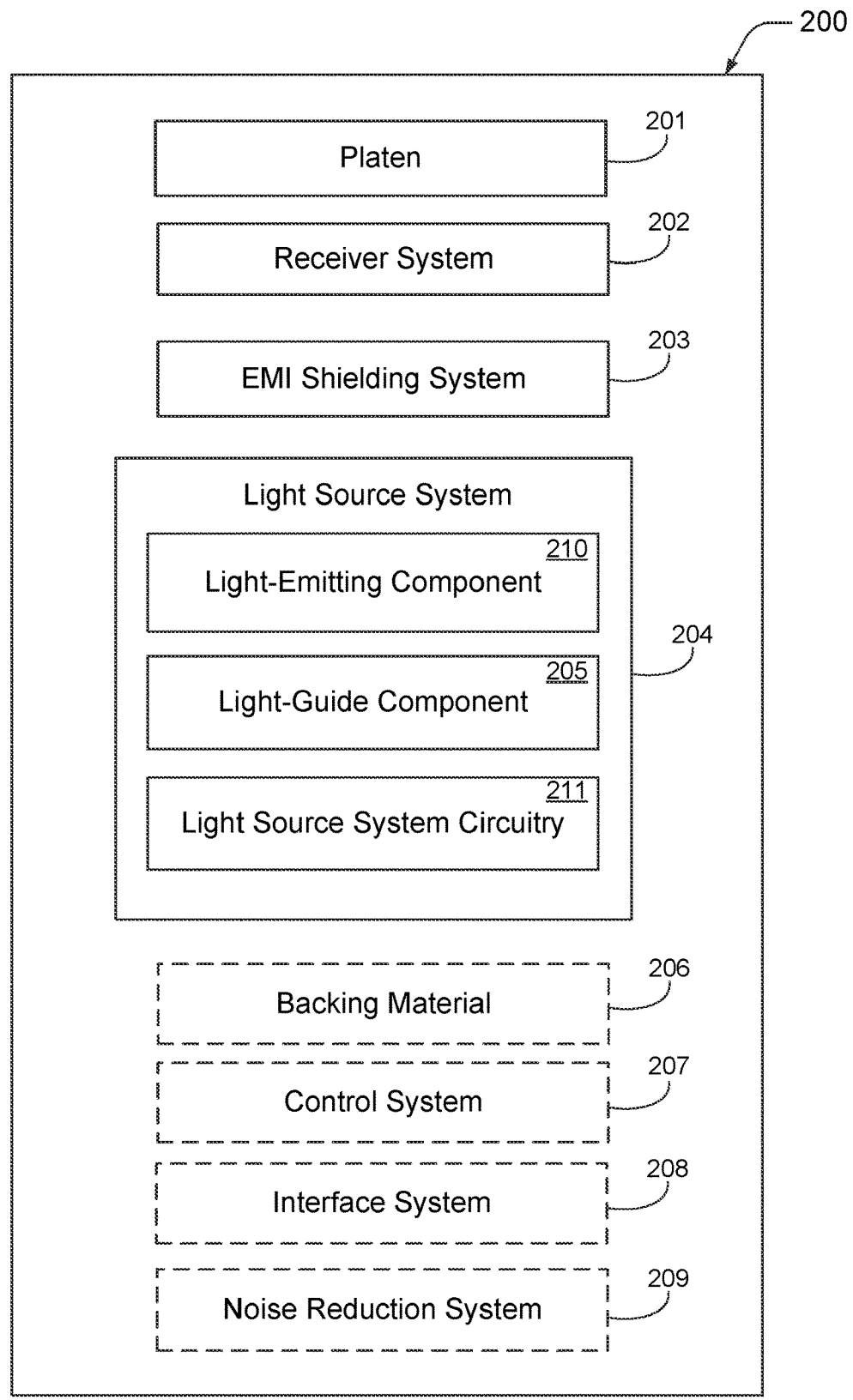
FIG. 2 is a block diagram that shows example components of an apparatus according to some implementations.

FIG. 2 is a block diagram that shows example components of an apparatus 200 according to some disclosed implementations. In this example, the apparatus 200 includes a platen 201, a receiver system 202, an electro-magnetic interference (EMI) shielding system 203, and a light source system 204. The light source system 204 can include a light guide component 205, light source system circuitry 211, and at least one light-emitting component 210. Some implementations of the apparatus 200 may include backing material 206, a control system 207, an interface system 208, a noise reduction system 209, or combinations thereof.

Various examples of platens 201 and various configurations of light source systems 204 and receiver systems 202 are disclosed herein. Some examples are described in more detail below. The platen 201 may be made of any suitable material, such as glass, acrylic, polycarbonate, etc. According to some examples, the platen 201 (or another portion of the apparatus) may include one or more anti-reflective layers. In some examples, one or more anti-reflective layers may reside on, or proximate, one or more outer surfaces of the platen 201.

In some examples, at least a portion of the outer surface of the platen 201 may have an acoustic impedance that is configured to approximate an acoustic impedance of human skin. The portion of the outer surface of the platen 201 may, for example, be a portion that is configured to receive a target object, such as a human digit. (As used herein, the terms "finger" and "digit" may be used interchangeably, such that a thumb is one example of a finger.) A typical range of acoustic impedances for human skin is 1.53-1.680 MRayls. In some examples, at least an outer surface of the platen 201 may have an acoustic impedance that is in the range of 1.4-1.8 MRayls, or in the range of 1.5-1.7 MRayls. Alternatively, or additionally, in some examples at least an outer surface of the platen 201 may be configured to conform to a surface of human skin. In some such examples, at least an outer surface of the platen 201 may have material properties like those of putty or chewing gum.

In some examples, at least a portion of the platen 201 may have an acoustic impedance that is configured to approximate an acoustic impedance of one or more receiver elements of the receiver system 202. According to some examples, a layer residing between the platen 201 and one or more receiver elements may have an acoustic impedance that is configured to approximate an acoustic impedance of the one or more receiver elements. Alternatively, or additionally, in some examples a layer residing between the platen 201 and one or more receiver elements may have an acoustic impedance that is in an acoustic impedance range between an acoustic impedance of the platen and an acoustic impedance of the one or more receiver elements.

In some examples, the light source system 204 may be configured to emit light through a first area of the platen 201 towards a target object in contact with the first area of the platen 201. According to some examples, the light guide component 205 may be arranged to propagate light emitted by the light-emitting component 210 to the first area of the platen. According to some examples, the light guide component 205 may include one or more optical fibers. In some examples, the light guide component 205 may be, or may include, one or more holes arranged to allow light produced by the light-emitting component 210 to propagate towards the first area of the platen 201.

According to some examples, the receiver system 202 may include at least two receiver stack portions: a first receiver stack portion may reside proximate a first side of a first portion of the light guide component 205 and a second receiver stack portion may reside proximate a second side of the first portion of the light guide component 205. The first receiver stack portion and the second receiver stack portion may, in some examples, be portions of a first receiver stack ring. The receiver stack ring may be configured to surround the first portion of the light guide component 205. In some examples, the receiver system 202 may be configured to detect acoustic waves corresponding to a photoacoustic response of the target object to light emitted by the light source system 204.

Various examples of receiver systems 202 are disclosed herein, some of which may include ultrasonic receiver systems, optical receiver systems, or combinations thereof. In some implementations in which receiver systems 202 is, or includes, an ultrasonic receiver system, the ultrasonic receiver and an ultrasonic transmitter may be combined in an ultrasonic transceiver. In some examples, the receiver system 202 may include a piezoelectric receiver layer, such as a layer of polyvinylidene difluoride (PVDF) polymer, polyvinylidene fluoride-trifluoroethylene (PVDF-TrFE) copolymer, a piezoelectric composite, etc. In some implementations, a single piezoelectric layer may serve as an ultrasonic receiver. In some implementations, other piezoelectric materials may be used in the piezoelectric layer, such as aluminum nitride (AlN) or lead zirconate titanate (PZT).

The receiver system 202 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, a piezoelectric receiver layer, PMUT elements in a single-layer array of PMUTs, or CMUT elements in a single-layer array of CMUTs, may be used as ultrasonic transmitters as well as ultrasonic receivers. According to some examples, the receiver system 202 may be, or may include, an ultrasonic receiver array. In some examples, the apparatus 200 may include one or more separate ultrasonic transmitter elements. In some such examples, the ultrasonic transmitter(s) may include an ultrasonic plane-wave generator.

In some implementations, the receiver system 202 may be configured to operate at one or more mean frequencies over a bandwidth range (60% to 90%), such as, for example, one or more mean frequencies selected in a 1-40 MHz range. In an example implementation, the receiver system 202 is tuned to a mean frequency of 2.25 MHz and has a 2 MHz bandwidth.

The light-emitting component 210 may, in some examples, include one or more light-emitting diodes. In some implementations, the light-emitting component 210 may include one or more laser diodes. According to some implementations, the light-emitting component 210 may include one or more multi-junction vertical-cavity surface-emitting lasers (VCSELs). In some implementations, the light source system 204 may include one or more edge-emitting lasers. In some implementations, the light-emitting component 210 may include one or more neodymium-doped yttrium aluminum garnet (Nd:YAG) lasers.

In some examples, the light-emitting component 210 may be configured to emit laser pulses in a wavelength range of 500 nm to 1000 nm. The light-emitting component 210 may, in some examples, be configured to transmit light in one or more wavelength ranges. In some examples, the light-emitting component 210 may configured for transmitting light in a wavelength range of 500 to 600 nanometers (nm). According to some examples, the light-emitting component 210 may be configured for transmitting light in a wavelength range of 800 to 950 nm. In view of factors such as skin reflectance, fluence, the absorption coefficients of blood and various tissues, and skin safety limits, one or both of these wavelength ranges may be suitable for various use cases. For example, the wavelength ranges of 500 nm to 600 nm and of 800 to 950 nm may both be suitable for obtaining photoacoustic responses from relatively smaller, shallower blood vessels, such as blood vessels having diameters of approximately 0.5 mm and depths in the range of 0.5 mm to 1.5 mm, such as may be found in a finger. The wavelength range of 800 to 950 nm may, for example, be suitable for obtaining photoacoustic responses from relatively larger, deeper blood vessels, such as blood vessels having diameters of approximately 2.0 mm and depths in the range of 2 mm to 3 mm, such as may be found in an adult wrist.

The light source system circuitry 211 may include various types of drive circuitry, depending on the particular implementation. In some disclosed implementations, the light-emitting component 210 may include at least one multi-junction laser diode, which may produce less noise than single-junction laser diodes. In some examples, the light source system circuitry 211 may be configured to cause the light-emitting component 210 to emit pulses of light at pulse widths in a range from 3 nanoseconds to 1000 nanoseconds. According to some examples, the light source system circuitry 211 may be configured to cause the light source system to emit pulses of light at pulse repetition frequencies in a range from 1 kilohertz to 100 kilohertz.

In some implementations, the apparatus (for example, the receiver system 202, the light source system 204, or both) may include one or more sound-absorbing layers, acoustic isolation material, light-absorbing material, light-reflecting material, or combinations thereof. In some examples, acoustic isolation material may reside between the light source system 204 and at least a portion of the receiver system 202.

In some implementations, the light source system 204 may be configured for emitting various wavelengths of light, which may be selectable to trigger acoustic wave emissions primarily from a particular type of material. For example, because the hemoglobin in blood absorbs near-infrared light very strongly, in some implementations the light source system 204 may be configured for emitting one or more wavelengths of light in the near-infrared range, in order to trigger acoustic wave emissions from hemoglobin. However, in some examples the control system 207 can be a part of that light source system circuitry 211 and can be configured to control the wavelength(s) of light emitted by the light-emitting component 210 to preferentially induce acoustic waves in blood vessels, other soft tissue, and/or bones. For example, an infrared (IR) light-emitting diode LED may be selected and a short pulse of IR light emitted to illuminate a portion of a target object and generate acoustic wave emissions that are then detected by the receiver system 202. In another example, an IR LED and a red LED or other color such as green, blue, white or ultraviolet (UV) may be selected and a short pulse of light emitted from each light source in turn with ultrasonic images obtained after light has been emitted from each light source. In other implementations, one or more light sources of different wavelengths may be fired in turn or simultaneously to generate acoustic emissions that may be detected by the ultrasonic receiver. Image data from the ultrasonic receiver that is obtained with light sources of different wavelengths and at different depths (e.g., varying RGDs) into the target object may be combined to determine the location and type of material in the target object. Image contrast may occur as materials in the body generally absorb light at different wavelengths differently. As materials in the body absorb light at a specific wavelength, they may heat differentially and generate acoustic wave emissions with sufficiently short pulses of light having sufficient intensities. Depth contrast may be obtained with light of different wavelengths and/or intensities at each selected wavelength. That is, successive images may be obtained at a fixed RGD (which may correspond with a fixed depth into the target object) with varying light intensities and wavelengths to detect materials and their locations within a target object. For example, hemoglobin, blood glucose or blood oxygen within a blood vessel inside a target object such as a finger may be detected photoacoustically.

According to some implementations, the light-emitting component 210 may be configured for emitting a light pulse with a pulse width less than about 100 nanoseconds. In some implementations, the light pulse may have a pulse width between about 10 nanoseconds and about 500 nanoseconds or more. According to some examples, the light-emitting component 210 may be configured for emitting a plurality of light pulses at a pulse repetition frequency between 10 Hz and 100 kHz. Alternatively, or additionally, in some implementations the light-emitting component 210 may be configured for emitting a plurality of light pulses at a pulse repetition frequency between about 1 MHz and about 100 MHz. Alternatively, or additionally, in some implementations the light-emitting component 210 may be configured for emitting a plurality of light pulses at a pulse repetition frequency between about 10 Hz and about 1 MHz. In some examples, the pulse repetition frequency of the light pulses may correspond to an acoustic resonant frequency of the ultrasonic receiver and the substrate. For example, a set of four or more light pulses may be emitted from the light-emitting component 210 at a frequency that corresponds with the resonant frequency of a resonant acoustic cavity in the sensor stack, allowing a build-up of the received ultrasonic waves and a higher resultant signal strength. In some implementations, filtered light or light sources with specific wavelengths for detecting selected materials may be included with the light source system 204. In some implementations, the light source system 204 may contain light sources such as red, green and blue LEDs of a display that may be augmented with light sources of other wavelengths (such as IR and/or UV) and with light sources of higher optical power. For example, high-power laser diodes or electronic flash units (e.g., an LED or xenon flash unit) with or without filters may be used for short-term illumination of the target object.

The backing material 206 can be included in some implementations and omitted in some other implementations. When included, the backing material 206 can be configured to suppress at least some acoustic artifacts inside the apparatus 200 in an area around the receiver system 202, for example, and may provide a relatively higher signal-to-noise ratio (SNR) than receiver systems 202 that lack the backing material 206. In some examples, the backing material 206 may be provided in the form of a backing layer that includes metal, epoxy, or a combination thereof. Optimizing a performance of the apparatus 200 can involve making a trade-off between obtaining a high SNR value and a smaller packaging size. Thus, when a compact size is desired, it may be preferable to either reduce a thickness of the backing material 206 based on a desired SNR value or eliminate the backing material 206 based on an acceptable SNR value. In one implementation, the thickness of the backing material 206 can be less than 5 mm, for example, about 2 mm or anywhere in a range from about 1 mm to about 5 mm.

In some implementations, the control system 207 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The control system 207 also may include (and/or be configured for communication with) one or more memory devices, such as one or more random access memory (RAM) devices, read-only memory (ROM) devices, etc. Accordingly, the apparatus 200 may have a memory system that includes one or more memory devices, though the memory system is not shown in FIG. 2. The control system 207 may be configured for receiving and processing data from the receiver system 202. If the apparatus 200 includes an ultrasonic transmitter, the control system 207 may be configured for controlling the ultrasonic transmitter. In some implementations, functionality of the control system 207 may be partitioned between one or more controllers or processors, such as a dedicated sensor controller and an applications processor of a mobile device.

In some examples, the control system 207 may be configured to control the light source system 204. For example, the control system 207 may be configured to control one or more light-emitting portions of the light source system 204 to emit laser pulses. The laser pulses may, in some examples, be in a wavelength range of 500 nm to 1000 nm. The laser pulses may, in some examples, have pulse widths in a range from 3 nanoseconds to 1000 nanoseconds. In some examples, the control system 207 may be configured to receive signals from the ultrasonic receiver system 202 corresponding to the ultrasonic waves generated by the target object responsive to the light from the light source system 204. In some examples, the control system 207 may be configured to estimate one or more cardiac features based, at least in part, on the signals. According to some examples, the cardiac features may be, or may include, blood pressure.

Some implementations of the apparatus 200 may include the EMI shielding system 203. The SNR performance of the apparatus 300 may be adversely impacted by EMI, unless EMI is mitigated. Light source system 204 is one source of EMI. In a compact PAPG-capable device, the light source system 204 may be in close proximity to components of the receiver system 202. Light emitted by the light source system 204 is another potential source of noise, in part because this light may induce a photoacoustic response in other components of the PAPG-capable device.

In some examples, the EMI shielding system 203 may include one or more electromagnetically shielded transmission wires. In some such examples, the one or more electromagnetically shielded transmission wires may be configured to reduce electromagnetic interference from circuitry of the light source system 204, receiver system circuitry, or combinations thereof, that is received by the receiver system 202. In some examples, the light source system circuitry may be grounded separately from the receiver system circuitry.

According to some examples, the EMI shielding system 203 includes at least a first EMI-reducing layer residing between circuitry of the light source system 204 and one or more elements of the receiver system 202. The first EMI-reducing layer may, in some examples, include a conductive material having a resistivity of less than $3\times10^{-8}$ ohm-meters. According to some examples, the first EMI-reducing layer may include a material having a magnetic permeability of at least $5\times10^{-3}$ henries per meter. The first EMI-reducing layer may, in some examples, be a portion of an EMI-reducing component that encloses at least a portion of the light source system 204. In some examples, the light source system 204 may be configured to emit light through the first EMI-reducing layer to a first platen area. In some such examples, the light source system 204 may be configured to emit light through an opening in the first EMI-reducing layer. In other examples, the light source system 204 may be configured to emit light through a transparent portion of the first EMI-reducing layer. The transparent portion may include transparent conductive material, such as indium tin oxide (ITO). In some examples, the EMI shielding system 203 may include an EMI-reducing component that encloses the receiver system circuitry.

According to some examples, the EMI shielding system 203 may be part of the noise reduction system 209. For example, the noise reduction system 209 may include one or more mirrors that are configured to reflect light from the light source system 204 away from the receiver system 202. In some implementations, the noise reduction system 209 may include one or more sound-absorbing layers, acoustic isolation material, light-absorbing material, light-reflecting material, or combinations thereof. In some examples, the noise reduction system 209 may include acoustic isolation material, which may reside between the light source system 204 and at least a portion of the receiver system 202, on at least a portion of the receiver system 202, or combinations thereof.

Some implementations of the apparatus 200 may include the interface system 208. In some examples, the interface system 208 may include a wireless interface system. In some implementations, the interface system 208 may include a user interface system, one or more network interfaces, one or more interfaces between the control system 207 and a memory system and/or one or more interfaces between the control system 207 and one or more external device interfaces (e.g., ports or applications processors), or combinations thereof. According to some examples in which the interface system 208 is present and includes a user interface system, the user interface system may include a microphone system, a loudspeaker system, a haptic feedback system, a voice command system, one or more displays, or combinations thereof. According to some examples, the interface system 208 may include a touch sensor system, a gesture sensor system, or a combination thereof. The touch sensor system (if present) may be, or may include, a resistive touch sensor system, a surface capacitive touch sensor system, a projected capacitive touch sensor system, a surface acoustic wave touch sensor system, an infrared touch sensor system, any other suitable type of touch sensor system, or combinations thereof.

The apparatus 200 may be used in a variety of different contexts, many examples of which are disclosed herein. For example, in some implementations a mobile device may include the apparatus 200. In some such examples, the mobile device may be a smart phone. In some implementations, a wearable device may include the apparatus 200. The wearable device may, for example, be a bracelet, an armband, a wristband, a watch, a ring, a headband or a patch.

Figure 3:
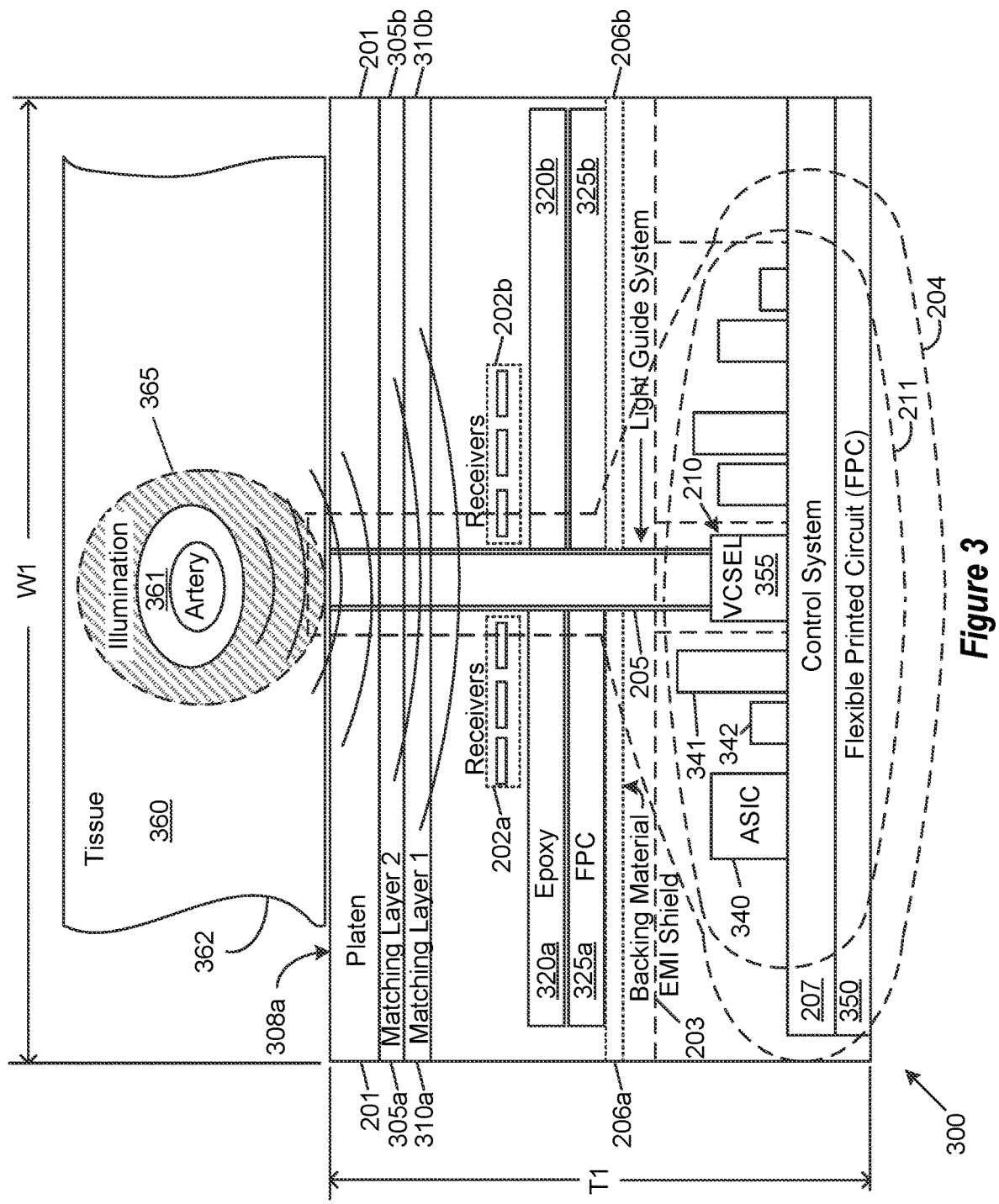
FIG. 3 shows example components of an apparatus according to a first implementation.

FIG. 3 shows example components of an apparatus 300 according to some disclosed implementations. As with other figures provided herein, the numbers, types and arrangements of elements shown in FIG. 3 are merely presented by way of example. In this example, the apparatus 300 is an instance of the apparatus 100 shown in FIG. 1. According to this example, the apparatus 300 includes the platen 201, the receiver system 202, the light source system 204, and the control system 207.

In this example, the light-emitting component 210 of the light source system 204 is a VCSEL 355. The control system 207 can be provided upon a flexible printed circuit (FPC) 350. The control system 207, which in this example, is a part of the light source system circuitry 211, can include various components such as, for example, an application specific integrated circuit (ASIC) 340, a passive component 341 (capacitor, resistor, etc.), and an active component 342 (transistor, integrated circuit, etc.). The ASIC 340 can be designed to perform operations such as, for example, providing control signals to the VCSEL 355, recording waveforms produced by the receivers 202, and transferring data out of the apparatus 300 (to a processor of a computer, for example). In one implementation, the ASIC 340 is a customized component that is optimized for performing operations associated with the apparatus 300. The ASIC 340 can be mounted on the FPC 350 in a configuration that minimizes adverse noise effects.

In this example, an outer surface 308a of the platen 201 is configured to receive a target object 362, such as for example, a forearm or a finger, a wrist, etc. In this example, the target object 362 includes tissue 360 and an artery 361. The apparatus 300 can be used to obtain an arterial photoacoustic signal that includes signals from a front portion as well as rear potion of the artery 361, thereby allowing detection of arterial parameters such as, for example, size, diameter, area, etc., with respect to time periods that include distension and straining of the artery 361.

According to this example, the receiver system 202, is, or includes, an ultrasonic receiver system. In this example, the receiver system 202 includes a receiver stack portion 202a and a receiver stack portion 202b. In this example, the receiver stack portion 202 can include piezoelectric material, an electrode layer on a first side of the piezoelectric material, and an electrode layer on a second side of the piezoelectric material. According to some examples, a layer of anisotropic conductive film (ACF) may reside between each of the electrode layers and the piezoelectric material. The electrode layers can include conductive material, which may be, or may include, a conductive metal such as copper in some instances. The electrode layers may be electrically connected to receiver system circuitry, which is not shown in FIG. 3. The receiver system circuitry may be regarded as a part of the control system 207 that is described herein with reference to FIG. 1, or as a part of the receiver system 202, or both. The piezoelectric material may, for example, include a polyvinylidene difluoride (PVDF) polymer, a polyvinylidene fluoride-trifluoroethylene (PVDF-TrFE) copolymer, aluminum nitride (AlN), lead zirconate titanate (PZT), piezoelectric composite material, such as a 1-3 composite, a 2-2 composite, a 3-3 composite, etc., or combinations thereof. In an example, the receivers of the receiver system 202 may be mounted upon a flexible printed circuit (FPC) 350 by means of an epoxy layer 320.

The platen 201 may include any suitable material, such as glass, acrylic, polycarbonate, combinations thereof, etc. In some examples, a width W1 of the platen 201 may be in the range of 2 mm to 10 mm, such as, for example, 4 mm, 5 mm, 6 mm, etc. According to some examples, the thickness of the platen 201 (in the z direction of the coordinate system shown in FIG. 3) may be in the range of 50 microns to 500 microns, such as, for example, 150 microns, 200 microns, 250 microns, 300 microns, etc.

In this example, the platen 201 can include transparent material and in some examples, may also include one or more anti-reflective layers. In some examples, one or more matching layers may be included between an inner surface of the platen 201 and an interior portion of the apparatus 300. Two example matching layers 305 and 310 may have an acoustic impedance that is selected to reduce the reflections of acoustic waves caused by the acoustic impedance contrast between one or more layers of the receiver stack portions 202a and 202b that are adjacent to, or proximate, the matching layers 305 and 310. According to some examples, the matching layers 305 and 310 may include polyethylene terephthalate (PET).

According to this example, the light source system 204 includes at least a first light-emitting component (the VCSEL 355, in this example). The light-emitting component may, for example, include one or more light-emitting diodes, one or more laser diodes, one or more VCSELs, one or more edge-emitting lasers, one or more neodymium-doped yttrium aluminum garnet (Nd:YAG) lasers, or combinations thereof.

In this example, the light source system 204 is configured to emit light through a first area of the platen towards a target object that is in contact with the first area of the platen 201. According to this example, the light-emitting component 210 is configured to transmit light through the light guide component 205 and the platen 201 towards the target object 362, which is in contact with the outer surface 308a of the platen 201. In this example, an illumination 365 is produced above the outer surface 308a of the platen 201. The illumination 365 illuminates the artery 361 of the target object 362 and produces photoacoustic waves responsive to the illumination 365. The photoacoustic waves travel through the platen 201 and towards the receiver 202a and the receiver 202b.

According to this example, the light guide component 205 may include any suitable material, or combination of materials, for causing at least some of the light emitted by the light-emitting component 210 (VCSEL 355) to propagate within the light guide component 205, for example due to total internal reflection between one or more core materials and one or more cladding materials of the light guide component. In such examples, the core material(s) will have a higher index of refraction than the cladding material(s). In one specific and non-limiting example, the core material may have an index of refraction of approximately 1.64 and the cladding material may have an index of refraction of approximately 1.3. In some examples, the core material(s) may include glass, silica, quartz, plastic, zirconium fluoride, chalcogenide, or combinations thereof. According to some examples, the cladding material(s) may include polyvinyl chloride (PVC), acrylic, polytetrafluoroethylene (PTFE), silicone or fluorocarbon rubber. The light guide component 205 may, in some examples, include one or more optical fibers. The terms "light guide" and "light pipe" may be used herein synonymously.

In some examples, the width of the light guide component 205 may be in the range of 0.25 mm to 3 mm, for example 0.5 mm, 1.0 mm, 1.5 mm, etc. According to some examples, the width of a space between the receiver stack portion 202a and the receiver stack portion 202b may be in the range of 0.5 mm to 5 mm, for example 1.0 mm, 1.5 mm, 2 mm, 2.5 mm, etc. In some examples, a space between the receiver stack portion 202a and the light guide component and a space between the receiver stack portion 202b and the light guide component, if any, may include light-absorbing material. According to some examples, the spaces, if any, may include air. In some examples, the spaces, if any, may include sound-absorbing material, preferably sound-absorbing material having a relatively low Grüneisen parameter.

In some examples, the light guide component 205 has a substantially uniform cross-section. The substantially uniform cross-section can be, for example, a substantially uniform circular cross-section, a substantially uniform oval cross-section, a substantially uniform polygonal cross-section, etc. In an example implementation, the light guide component 205 has a cylindrical shape (substantially uniform diameter) extending from a proximal end of the light guide component 205 that abuts a light emitting surface of the VCSEL 355 to a distal end of the light guide component 205 that is planar to the outer surface 308a of the platen 201. The substantially uniform cross-section, which can be referred to as a non-tapering cross-section, of the light guide component 205, offers several advantages over a prior-art PAPG apparatus in which the light guide component has a tapering profile. As used herein, a light guide having a "substantially uniform cross-section" may refer to a light guide having a cross-section with less than a 2 percent variation, less than a 5 percent variation, less than an 8 percent variation, less than a 10 percent variation, etc.

For example, some previously-conceived PAPG devices may include a light guide component having a tapering profile that has a larger cross-section (circular cross-section, for example) at a proximal end of the light guide component that abuts a light emitting surface of a VCSEL to a distal end of the light guide component that is planar to an outer surface of a platen. The larger cross-section may be selected to provide efficient light coupling from the VCSEL into the light guide component and the narrower cross-section at the distal end may be selected to offer a desirable light dispersion characteristic. However, the tapering profile, particularly the larger cross-section at the proximal end of the light guide component increases a horizontal dimension of the previously-conceived PAPG apparatus (width and depth) and a taper characteristic (angle of taper, slope, etc.) increases a vertical dimension of the previously-conceived PAPG apparatus (height).

The apparatus 300 having the non-tapering light guide component 205 as illustrated in FIG. 3 offers a size reduction in all three dimensions (width, depth, and height). The non-tapered shape of the light guide component 205 that abuts the VCSEL 355 is facilitated by technological improvements in VCSEL devices such as, for example, enhanced light emission over a smaller light emitting surface area of a VCSEL, and size reductions in VCSELS that allow multiple VCSELs to be clustered next to each other and oriented to collectively emit light into the light guide component 205. When so clustered, the VCSEL 355 illustrated in FIG. 3 can comprise multiple VCSELs arranged to emit light into the light guide component 205. In an implementation, the light guide component 205 can include multiple optical fibers and each optical fiber of the multiple optical fibers may be configured to receive light emitted by a respective one of the multiple VCSELs.

The reduction in size of the apparatus 300 as a result of the non-tapering light guide component 205 offers several advantages, such as, for example, improved performance due to a higher level of efficiency of the light guide component 205 (higher level of illumination, reduced dispersion, etc.), higher packaging density (multiple VCSELS and light guide components can be provided over a relatively small footprint), and manufacturing benefits (uniformity of performance, testing, scalability, etc.).

A reduction in size of the apparatus 300 can be further achieved by reducing an amount of backing materials 206 or eliminating the backing material 206. The backing material 206 may be configured to suppress at least some acoustic artifacts and may provide a relatively higher signal-to-noise ratio (SNR) than receiver systems that lack a backing material. In some examples, the backing material 206 may include metal, epoxy, or a combination thereof. In the example apparatus 300 shown in FIG. 3, the backing material 206 is located below a flexible printed circuit layer 350 upon which is provided an epoxy layer 320. In other examples, the backing material 206 can be provided in other places inside the apparatus 300 such as, for example, between an inner wall of a housing and the example components shown in FIG. 3. In some other examples, the backing material 206 can be omitted in part, or in its entirety. Omitting the backing material 206 in part, or in its entirety, can be based on, for example, selecting one or both of the matching layers 305 and 310 to have an acoustic impedance that minimizes reflections of acoustic waves caused by the acoustic impedance contrast between the matching layers 305 and 310 and one or more layers of the receiver stack portions 202a and 202b that are adjacent to, or proximate, the matching layers 305 and 310. Omitting the backing material 206 in part, or in its entirety, can be further based on executing a receiver-side beamforming process upon ultrasonic receiver signals inside the apparatus 300. In some implementations, one or more types of signal processing can be applied to receiver system signals to cancel noise resulting from having no backing layer residing between the receiver 202 and the EMI shielding system 203. Some details pertaining to a receiver-side beamforming process are provided below.

In the example shown in FIG. 3, the apparatus 300 has a thickness of T1 from the outer surface 308a of the platen 201 to an outer surface of the FPC 350. In some examples, T1 may be in the range of 3 mm to 6 mm. In some other examples, T1 may be in the range of 1 mm to 8 mm. A part of the thickness T1 is due to the backing material 206. Implementations that lack a backing material, or backing materials, can be substantially thinner than implementations that include a backing material, or backing materials.

Figure 4:
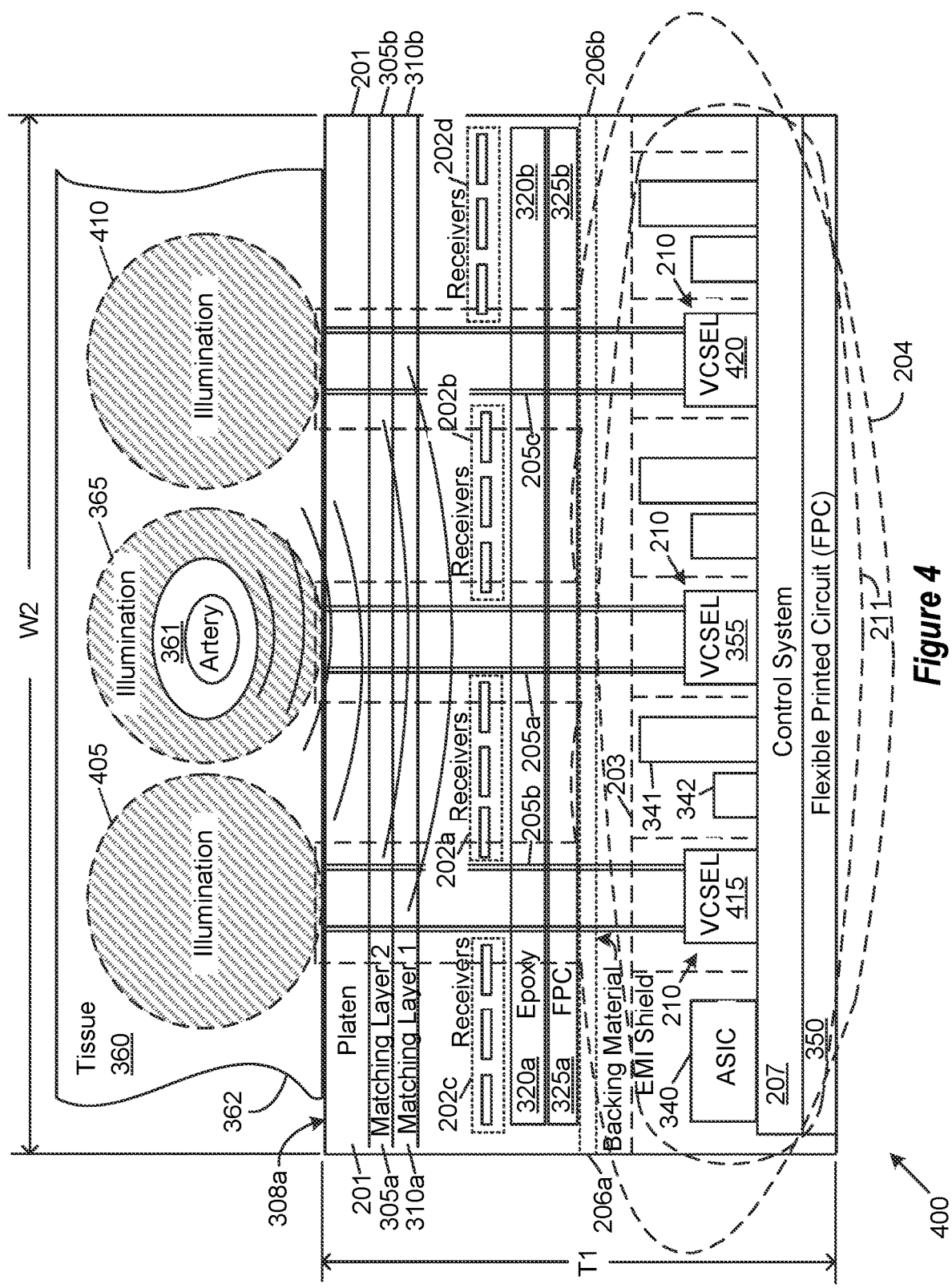
FIG. 4 shows example components of an apparatus according to a second implementation.

FIG. 4 shows a cross-sectional view of an example apparatus 400 that includes an array of light guides and multiple light emitting sources. As with other figures provided herein, the numbers, types and arrangements of elements shown in FIG. 4 are merely presented by way of example. Furthermore, a description provided with respect to an element having a numerical designator in one figure is equally applicable to the element having the same numerical designator when shown in another figure and may not necessarily be repeated in subsequent figures. Thus, for example, a description pertaining to the light guide component 205 that is provided above with reference to FIG. 1 and FIG. 2 is equally applicable to the light guide component 205 shown in FIG. 4 and other figures. In this example, the light guide component 205 includes three components—a light guide component 205a, a light guide component 205b, and a light guide component 205c.

According to this example, the apparatus 400 includes the platen 201, the receiver system 202, the light guide component 205, and the light source system 204. The light source system 204 in this example further includes at least two light-emitting components. In the illustrated implementation, the light source system 204 includes the first light-emitting component (the VCSEL 355), a second light-emitting component (a VCSEL 415, in this example) and a third light-emitting component (a VCSEL 420, in this example).

The light guide component 205a is configured to propagate light emitted by the VCSEL 355 through a first area of the platen towards the target object 362 that is in contact with the outer surface 308a of the platen 201. The illumination 365 illuminates the artery 361 of the target object 362 and produces photoacoustic waves responsive to the illumination 365. The photoacoustic waves travel through the platen 201 and towards the receiver 202a and the receiver 202b.

The light guide component 205b is configured to propagate light emitted by the VCSEL 415 through a second area of the platen towards the target object 362 that is in contact with the outer surface 308a of the platen 201. The illumination 405 illuminates an area adjacent to one side of the illumination 365.

The light guide component 205c is configured to propagate light emitted by the VCSEL 420 through a third area of the platen 201 towards the target object 362 that is in contact with the outer surface 308a of the platen 201. The illumination 410 illuminates an area adjacent to the other side of the illumination 365.

In an example implementation, two or more of the VCSELs (VCSEL 355, VCSEL 415, and VCSEL 420, in the illustrated example) are configured to emit light at different wavelengths. For example, the VCSEL 355 can be configured to emit light having a first wavelength, the VCSEL 355 can be configured to emit light having a second wavelength, and the VCSEL 355 can be configured to emit light having a third wavelength. The spacing between each pair of light guide components (light guide component 205a, light guide component 205b, and light guide component 205c, in the illustrated example) can range from about 2 mm to about 10 mm. In an example implementation, the spacing between each pair of light guide components ranges from about 3 mm to about 4 mm.

In the illustrated example, the artery 361 is located above the first area of the platen 201 and is illuminated by the illumination 365. The illumination 365 illuminates the artery 361 of the target object 362 and produces photoacoustic waves responsive to the illumination 365. The photoacoustic waves travel through the platen 201 and towards the receiver 202a and the receiver 202b.

In another example, the artery 361 can be located in the second area such as, for example, due to placement of the target object 362 in a different orientation or position. In this case, the illumination 405 illuminates the artery 361 of the target object 362 and produces photoacoustic waves responsive to the illumination 405. The photoacoustic waves travel through the platen 201 and towards the receiver 202a and the receiver 202c located on either side of the light guide component of the light guide component 205b.

In another example, the artery 361 can be located in the third area such as, for example, due to placement of the target object 362 in a different orientation or position. In this case, the illumination 410 illuminates the artery 361 of the target object 362 and produces photoacoustic waves responsive to the illumination 410. The photoacoustic waves travel through the platen 201 and towards the receiver 202b and the receiver 202d located on either side of the light guide component of the light guide component 205c.

The apparatus 400 that includes the array of light guides and multiple light emitting sources can be packaged in the form of a compact module that can be smaller than an existing apparatus containing tapering light guides and a conventional amount of backing material. The reduction in size of the apparatus 400 in comparison to the existing apparatus can be due to the non-tapering light guide components, a reduction in backing material, and/or an elimination of backing material. The apparatus 400, which can be referred to herein as a compact device, offers several advantages such as, for example, improved performance due to a higher level of efficiency (higher level of illumination, reduced dispersion, etc.), higher packaging density (multiple VCSELS and light guide components can be provided over a relatively small footprint), and manufacturing benefits (uniformity of performance, testing, scalability, etc.).

In an example application, the apparatus 400 can be used to obtain an arterial photoacoustic signal that includes signals from a front portion as well as rear potion of the artery 361, thereby allowing detection of arterial parameters such as, for example, size, diameter, area etc. with respect to time periods that include distension and straining of the artery 361. The apparatus 400 can be further used to obtain information of blood flow/distension along a length of the target object 362, thereby allowing for calculating of a pulse wave velocity.

Figure 5:
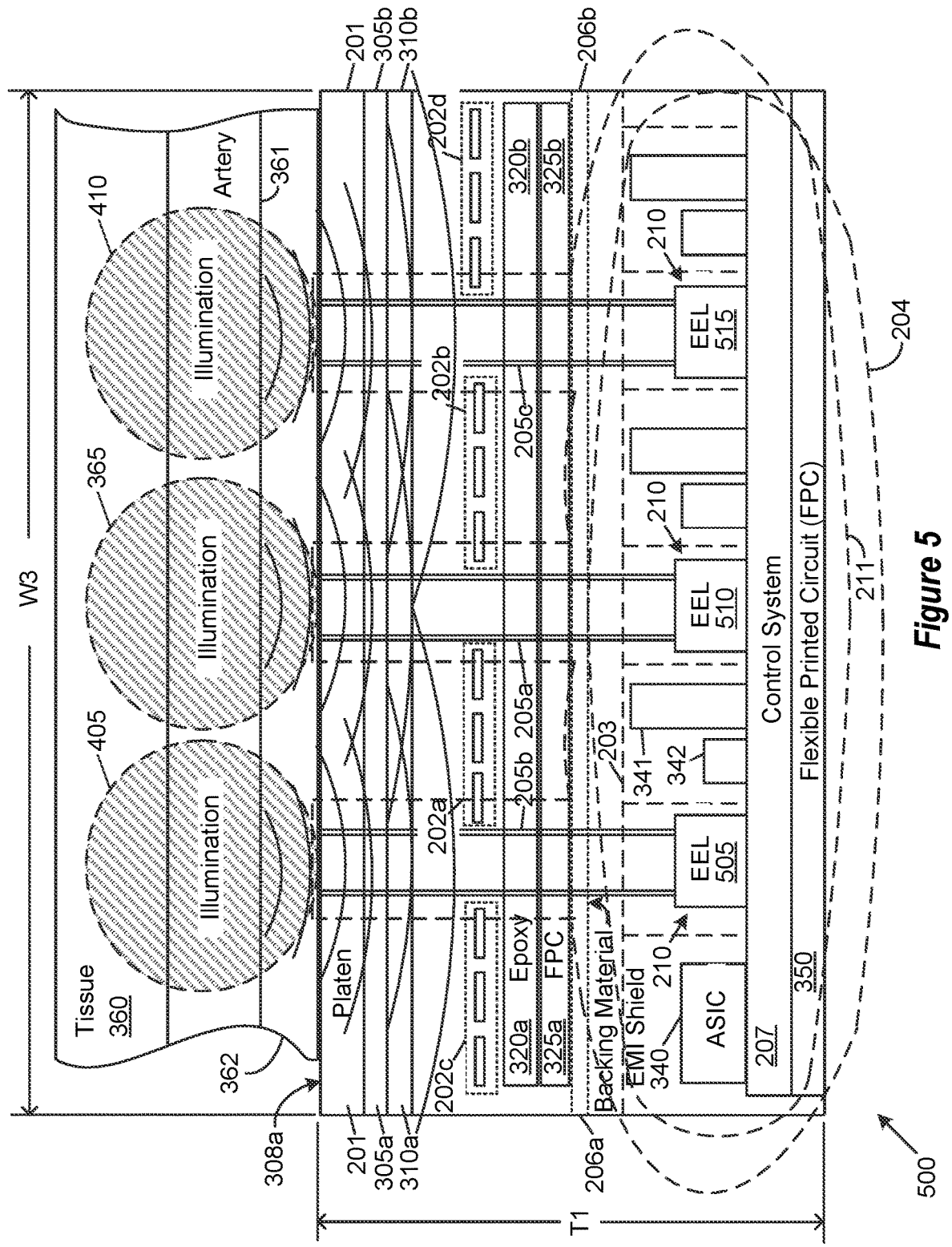
FIG. 5 shows example components of an apparatus according to a third implementation.

FIG. 5 shows a cross-sectional view of an example apparatus 500 that includes an array of light guides and multiple light emitting sources. The apparatus 500 can be identical to the apparatus 400 in all respects except for the light source system 204. In this example, the VCSEL(s) described above with reference to the apparatus 400 have been replaced with a set of edge-emitting lasers (EELs). In another example, the VCSEL 355 that is a part of the apparatus 300 can be similarly replaced by one EEL.

A light emitting surface of an EEL can be smaller than a light emitting surface of a VCSEL. Thus, a width W3 of the apparatus 500 containing the EELs can be smaller in comparison to the width W2 of the apparatus 400 containing the VCSELs. In one example, an EEL 505 can be arranged to emit light into the light guide component 205b. In this example, the light guide component 205a can include multiple optical fibers. The EEL 510 can be arranged to emit light into the light guide component 205a. In this example, the light guide component 205a can include multiple optical fibers. EEL 515 can be arranged to emit light into the light guide component 205c. In this example, the light guide component 205c can include multiple optical fibers.

Figure 6:
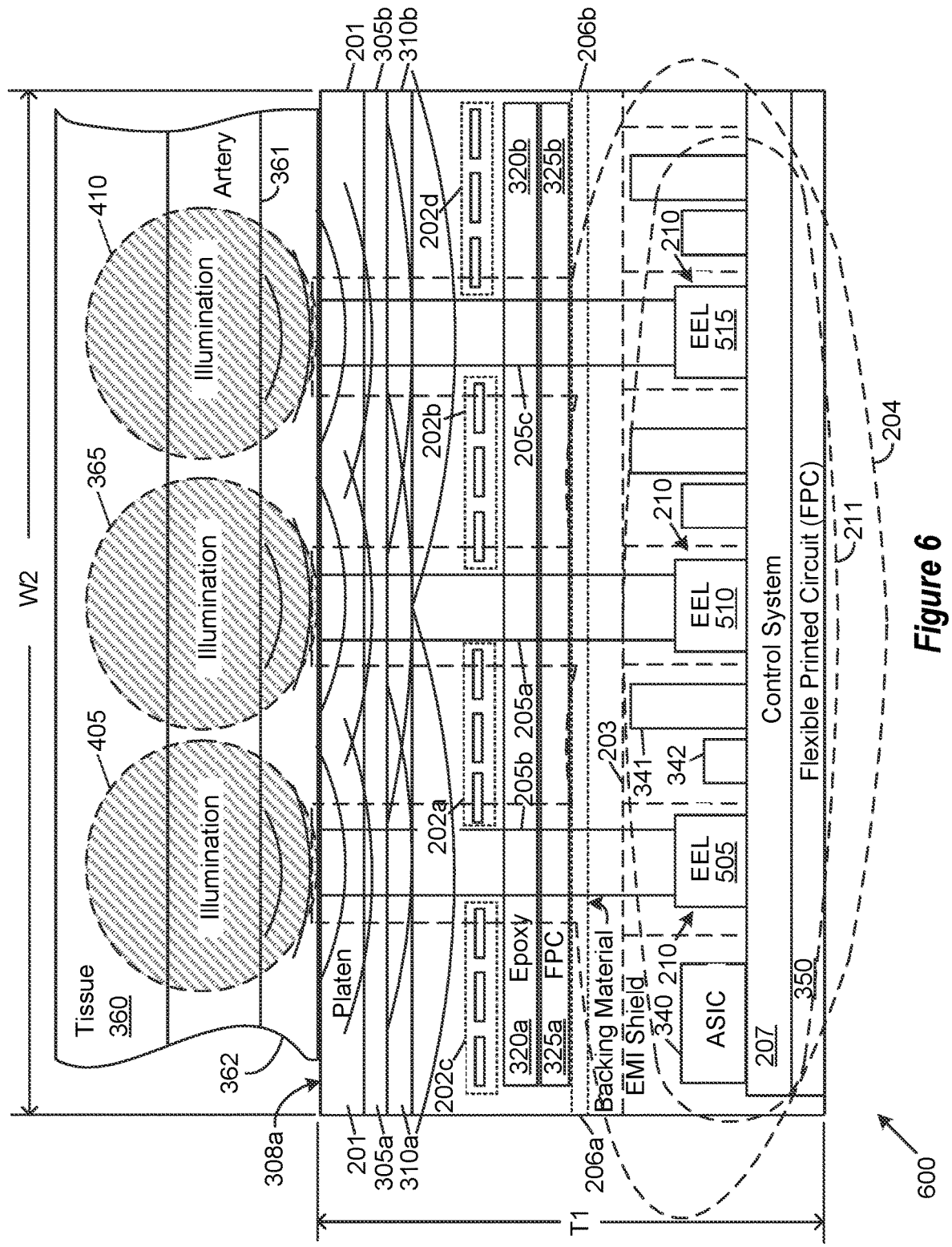
FIG. 6 shows example components of an apparatus according to a fourth implementation.

FIG. 6 shows a cross-sectional view of an example apparatus 600 that includes an array of light guides and multiple light emitting sources. The apparatus 600 can be identical to the apparatus 500 in all respects except for the light guide component 205. In this embodiment, each light guide of the light guide component 205 is a hole configured as a light guide component having a uniform cross-section. The uniform cross-section can be, for example, a uniform circular cross-section, a uniform oval cross-section, a uniform polygonal cross-section, etc.

In this example, the hole 205a has a cylindrical cross-sectional profile (uniform diameter) extending from a proximal end of the light guide component that abuts a light emitting surface of the EEL 510 to a distal end of the hole that is planar to the outer surface 308a of the platen 201. The uniform cross-section, which can be referred to as a non-tapering cross-section, offers several advantages over a prior-art PAPG apparatus in which the light guide component has a tapering profile.

In this example, the hole 205b has a substantially cylindrical cross-sectional profile (substantially uniform diameter) extending from a proximal end of the light guide component that abuts a light emitting surface of the EEL 505 to a distal end of the hole that is planar to the outer surface 308a of the platen 201. The hole 205b has a substantially cylindrical cross-sectional profile (substantially uniform diameter) extending from a proximal end of the light guide component that abuts a light emitting surface of the EEL 505 to a distal end of the hole that is planar to the outer surface 308a of the platen 201.

In this example, the hole 205c has a substantially cylindrical cross-sectional profile (substantially uniform diameter) extending from a proximal end of the light guide component that abuts a light emitting surface of the EEL 515 to a distal end of the hole that is planar to the outer surface 308a of the platen 201. The hole 205c has a substantially cylindrical cross-sectional profile (substantially uniform diameter) extending from a proximal end of the light guide component that abuts a light emitting surface of the EEL 515 to a distal end of the hole that is planar to the outer surface 308a of the platen 201.

Figure 7:
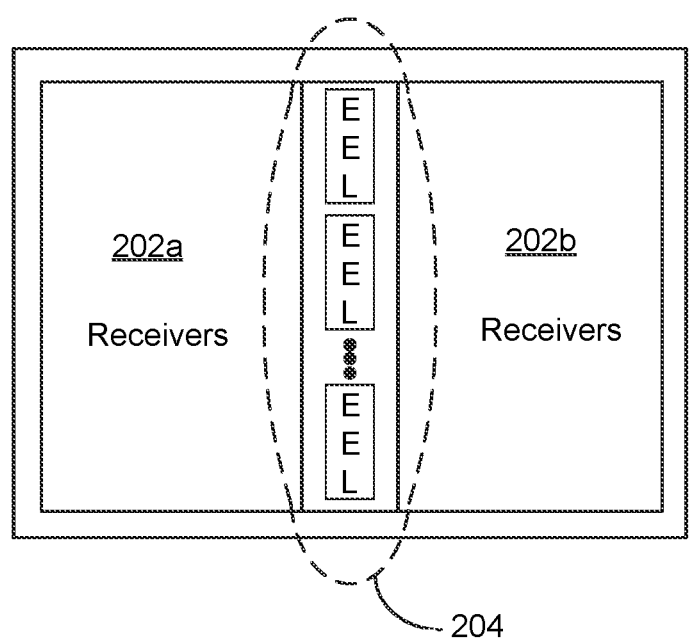
FIG. 7 shows a cross-sectional view from above of an example apparatus in accordance with an implementation.

FIG. 7 shows a cross-sectional view from above of an example apparatus such as the apparatus 500 or the apparatus 600 described above. As with other disclosed examples, the types, numbers, sizes and arrangements of elements shown in FIG. 7 and described herein are merely examples. According to this example, the apparatus includes the light source system 204 (in this example, a set of EELs) and the receiver system 202 (in this example, the receiver stack portions 202a and 202b). Each EEL in the set of EELs is arranged to emit light through the top surface of the 308a of the platen 201 (not shown) after propagating through the light guide component 205 (not shown).

In this example, the light source system 204 includes a single array of EELs. In another example, the light source system 204 can include VCSELs. In another example, the apparatus can include a plurality of EELs or VCELs in a multiple array arrangement.

Figure 8:
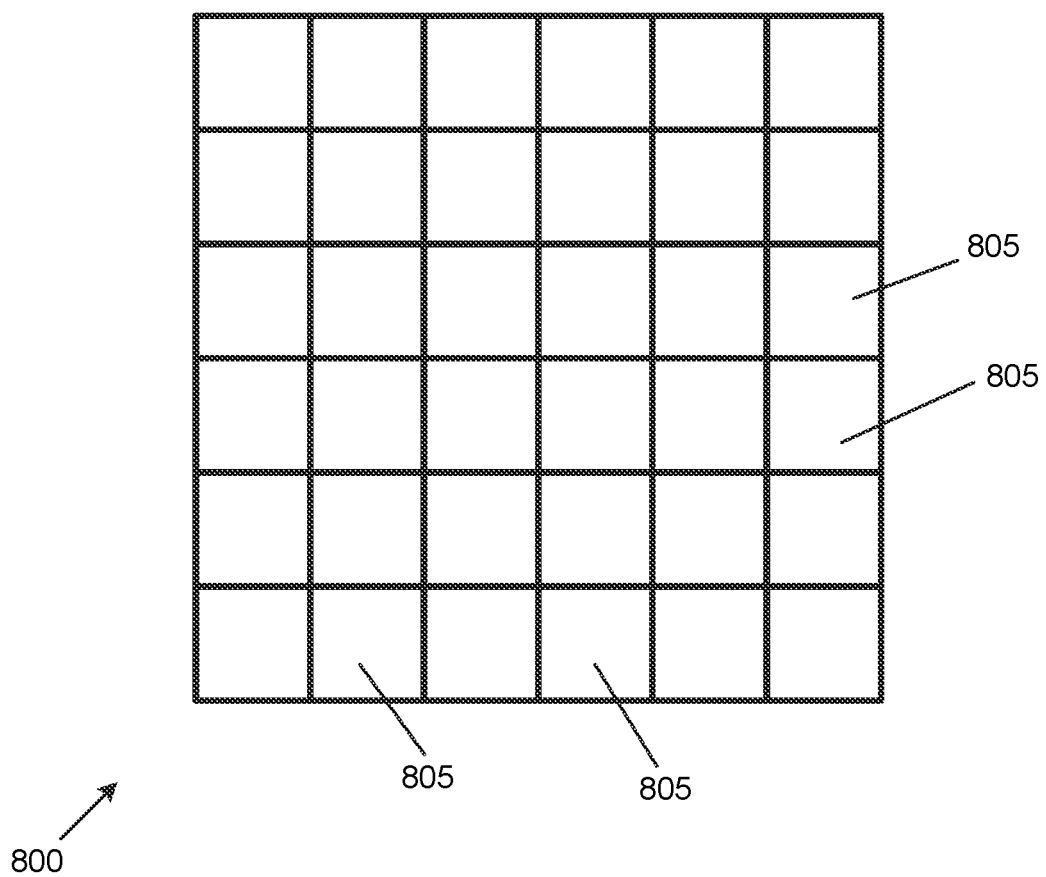
FIG. 8 shows an example of an ultrasonic receiver element array in accordance with an implementation.

FIG. 8 shows an ultrasonic receiver element array 800, which can be an example implementation of the receiver system 202. In this example, the ultrasonic receiver element array 800 is a two-dimensional (2D) array. According to this example, the array of ultrasonic receiver elements is arranged in a square having 6 active ultrasonic receiver elements 805 on each side and a total of 36 active ultrasonic receiver elements 805. As with other disclosed examples, the type, number, size and arrangement of elements shown in FIG. 8 and described herein are merely examples. For example, alternative examples of two-dimensional arrays of ultrasonic receiver elements may be arranged in a different shape, such as a non-square rectangular shape, a hexagonal shape, a symmetric shape, an asymmetric shape, etc. In some alternative examples, the ultrasonic receiver element array 800 may be a linear array, such as a single row or a single column of the ultrasonic receiver element array 800 shown in FIG. 8. In an example implementation, each receiver element 805 of the ultrasonic receiver element array 800 is tuned to a different mean frequency whereby the ultrasonic receiver element array 800 offers a broadband response.

Figure 9:
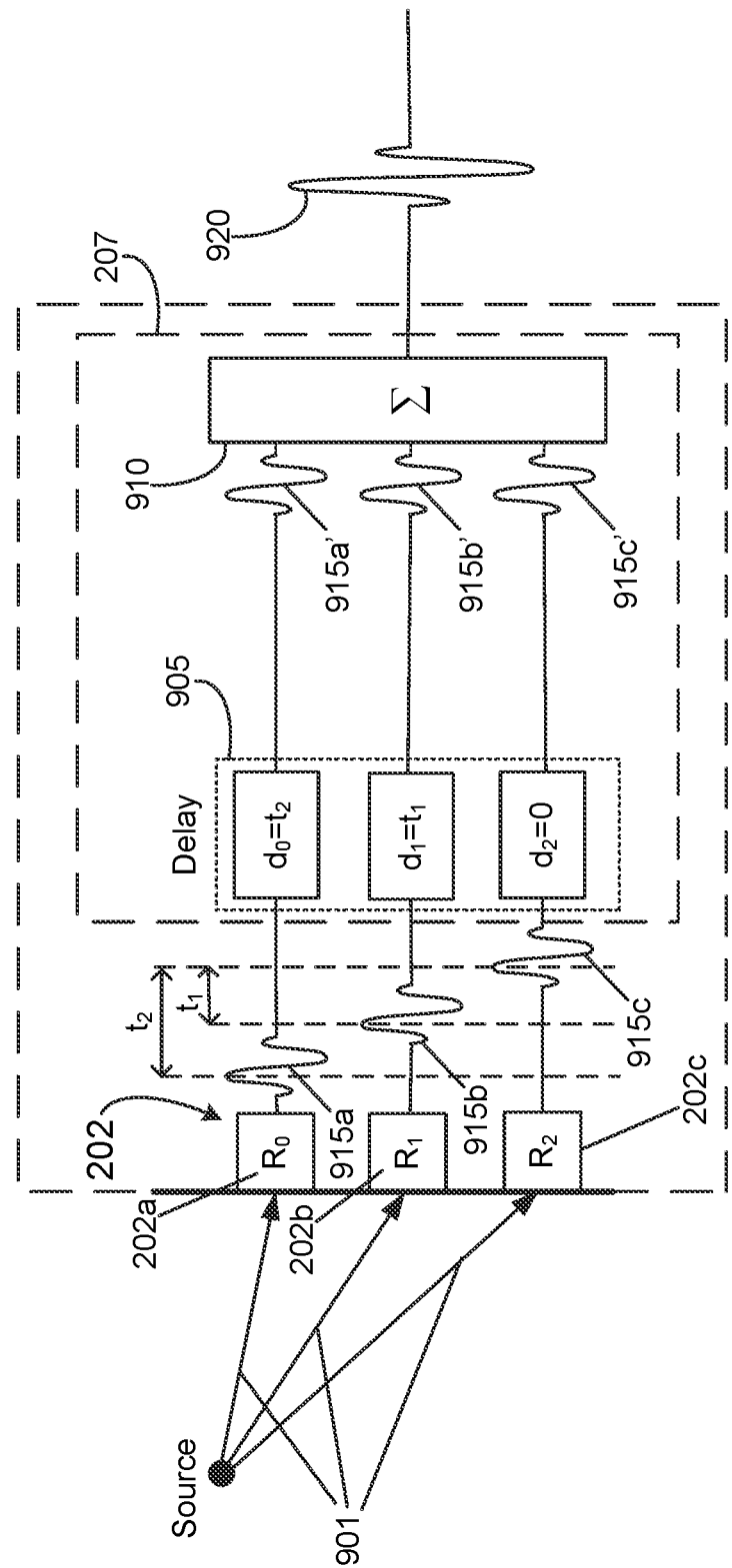
FIG. 9 shows an example apparatus that produces a beamformed ultrasonic receiver image in accordance with an implementation.

FIG. 9 shows an example of an apparatus (such as any of the example apparatuses described above), configured to produce a beamformed ultrasonic receiver image by performing a receiver-side beamforming process to ultrasonic receiver signals. According to some examples, the control system 207 may be configured to detect a blood vessel within a target object based, at least in part, on the beamformed ultrasonic receiver image. In some such examples, the control system 207 may be configured to estimate one or more blood vessel features based, at least in part, on the beamformed ultrasonic receiver image. In some examples, the control system 207 may be configured to estimate one or more cardiac features based, at least in part, on one or more arterial signals, on the blood vessel features. According to some examples, the cardiac features may be, or may include, blood pressure.

In this example, the receiver-side beamforming process is a delay-and-sum beamforming process. As with other disclosed examples, the types, numbers, sizes and arrangements of elements shown in FIG. 9 and described herein, as well as the associated described methods, are merely examples.

In this example, a source such as, for example, the VCSEL 355 shown in FIG. 3, is shown emitting ultrasonic waves 901, which are detected by active ultrasonic receiver elements 202a, 202b and 202c of an array of ultrasonic receiver elements 202. The array of ultrasonic receiver elements 202 is part of the receiver system 202 shown in FIG. 2. The ultrasonic waves 901 may, in some examples, correspond to the photoacoustic response of a target object (such as the target object 362 shown in FIG. 3) to light emitted by the light source system 204 of the apparatus 300. In this example, the active ultrasonic receiver elements 202a, 202b and 202c provide ultrasonic receiver signals 915a, 915b and 915c, respectively, to the control system 207.

According to this example, the control system 207 includes a delay module 905 and a summation module 910. In this example, the delay module 905 is configured to determine whether a delay should be applied to each of the ultrasonic receiver signals 915a, 915b and 915c, and if so, what delay will be applied. According to this example, the delay module 905 determines that a delay $d_0$ of $t_2$ should be applied to the ultrasonic receiver signal 915a, that a delay $d_1$ of $t_1$ should be applied to the ultrasonic receiver signal 915$_b$, and that no delay should be applied to the ultrasonic receiver signal 915$_c$. Accordingly, the delay module 905 applies a delay of $t_2$ to the ultrasonic receiver signal 915a, producing the ultrasonic receiver signal 915a', and applies a delay of $t_1$ to the ultrasonic receiver signal 915b, producing the ultrasonic receiver signal 915b'.

In some examples, the delay module 905 may determine what delay, if any, to apply to an ultrasonic receiver signal by performing a correlation operation on input ultrasonic receiver signals. For example, the delay module 905 may perform a correlation operation on the ultrasonic receiver signals 915a and 915c, and may determine that by applying a time shift of $t_2$ to the ultrasonic receiver signal 915a, the ultrasonic receiver signal 915a would be strongly correlated with the ultrasonic receiver signal 915c. Similarly, the delay module 905 may perform a correlation operation on the ultrasonic receiver signals 915b and 915c, and may determine that by applying a time shift of $t_1$ to the ultrasonic receiver signal 915b, the ultrasonic receiver signal 915b would be strongly correlated with the ultrasonic receiver signal 915c.

According to this example, the summation module 910 is configured to sum the ultrasonic receiver signals 915a', 915b' and 915c', producing the summed signal 920. One may observe that the amplitude of the summed signal 920 is greater than the amplitude of any one of the ultrasonic receiver signals 915a, 915b or 915c. In some instances, the signal-to-noise ratio (SNR) of the summed signal 920 may be greater than the SNR of any of the ultrasonic receiver signals 915a, 915b or 915c.

Figure 10:
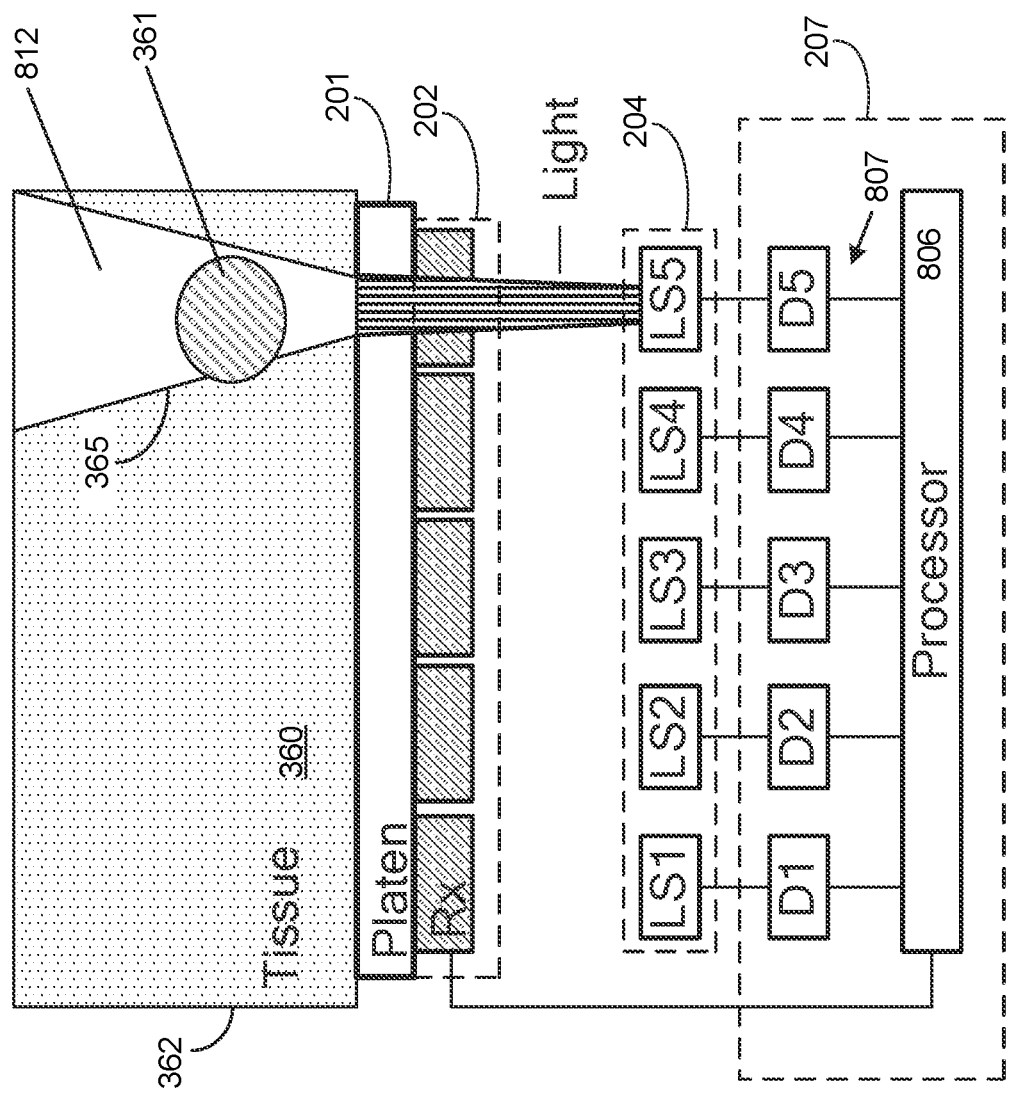
FIG. 10 shows example components of an apparatus according to a fifth implementation.

FIG. 10 shows an example of an alternative implementation. In this example, the light source system 204 includes 5 light sources (LS1-LS5), 5 corresponding instances of drive circuitry 807 (D1-D5) and a processor 806 that is configured to control the light source system 204 and to receive signals from the ultrasonic receiver system 202. In this example, the instances of drive circuitry 807 and the processor 806 are components of the control system 207. As with other disclosed examples, the types, numbers, sizes and arrangements of elements shown in FIG. 10 and described herein are merely examples. Other implementations may include different numbers of light sources (more than, or less than, the illustrated 5), receiver elements 202 (more than, or less than, the illustrated 5), or both.

As noted elsewhere herein, various disclosed implementations involve controlling a light source system to direct light to a plurality of areas of a target object. According to this example, controlling a light source system to direct light to a plurality of areas of the target object involves controlling multiple light sources 204 to direct light to a plurality of areas of the target object 362. One example of the areas of the target object 362 towards which light is directed is the illuminated area 365 of the target object 362 that is in contact with the platen 201. Another example of the areas of the target object 362 towards which light is directed is the illuminated volume 812 of the target object 362. Accordingly, an illuminated volume may be considered an "area" in this context. The target object 362 may be a finger, a wrist, etc., depending on the particular example. According to this example, the artery 361 resides within the target object 362. In some examples, a control system may cause 2, 3, 4, 5 or more light sources 204 to direct light to a plurality of areas of the target object in sequence.

Some examples may involve receiving ultrasonic receiver signals from an ultrasonic receiver system corresponding to photoacoustic responses of the target object to light provided the light source system to each area of the first plurality of areas. The ultrasonic receiver signals may correspond, at least in part, to ultrasonic waves generated by the target object responsive to the light from the light source system.

Some examples may involve determining a selected area of the target object from which additional ultrasonic receiver signals will be obtained. In some such examples, determining the selected area may involve detecting a blood vessel within the target object. The blood vessel may, for example, be detected according to a time window that corresponds with the speed of sound traversing an expected range of depth to a blood vessel. Alternatively, or additionally, the blood vessel may be detected according to one or more characteristics of the photoacoustic responses of the blood vessel walls, of blood within the blood vessel, or a combination thereof. In some examples, determining the selected area may involve estimating a signal-to-noise ratio (SNR) of ultrasonic receiver signals corresponding to at least a portion of the blood vessel and selecting an area corresponding to a highest SNR.

Some examples may involve selecting a light source 204 that corresponds to the highest SNR. In the example shown in FIG. 10, the light source LS5 illuminates the artery 361 most effectively and therefore the resulting photoacoustic response produced the highest SNR. Therefore, according to this example, the light source LS5 may be selected.

Some examples may involve controlling the light source system to obtain additional ultrasonic receiver signals from the selected area, via the selected light source, or both. According to some such examples, the control system 207 (shown in FIG. 2) may cause the light source LS5 to emit light towards a selected area, so that additional ultrasonic receiver signals may be obtained from the selected area. In some examples, the control system 207 may control the light source system 204 to cause the light source LS5 to emit light at a desired wavelength, pulse width, pulse rate, power level, or combinations thereof.

Figure 11:
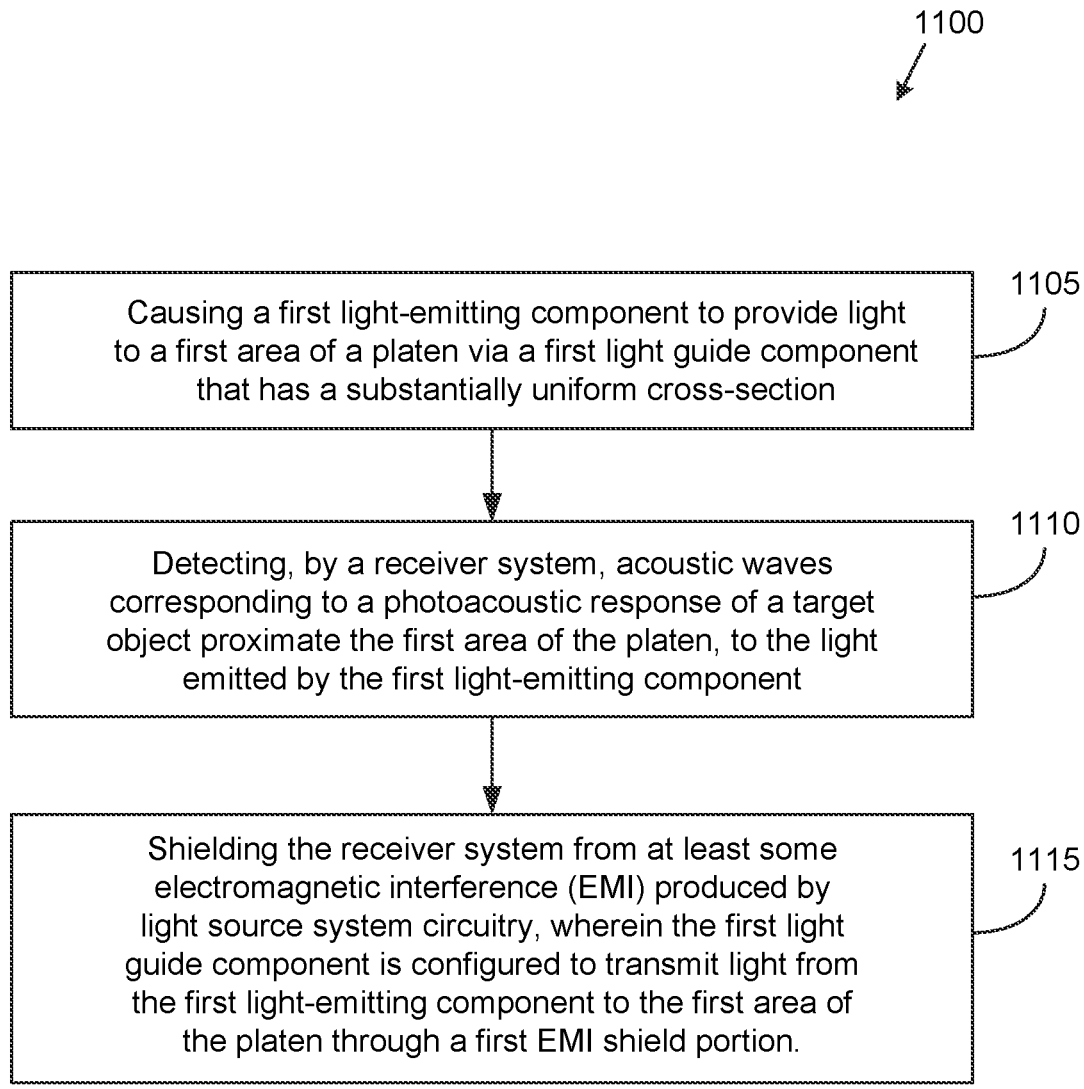
FIG. 11 is a flow diagram that shows examples of some disclosed operations.

FIG. 11 is a flow diagram 1100 that shows examples of some disclosed operations. The blocks of FIG. 11 may, for example, be performed by the apparatus 100 of FIG. 1 or by a similar apparatus. In some examples, some or all blocks of FIG. 9 may be performed by the control system 207. As with other methods disclosed herein, the method outlined in FIG. 9 may include more or fewer blocks than indicated. Moreover, the blocks of methods disclosed herein are not necessarily performed in the order indicated. In some instances, one or more of the blocks shown in FIG. 9 may be performed concurrently.

In this example, block 1105 involves causing a first light-emitting component to provide light to a first area of a platen via a first light guide component that has a substantially uniform cross-section. In an example implementation, block 1105 may involve the light-emitting component 210 (the VCSEL 355, for example) providing light to the first area of the platen 201 and towards the target object 362 that is in contact with the first area of the platen 201. The light provided by the light-emitting component 210 is propagated through the light guide component 205 having a substantially uniform cross-section.

Block 1110 involves detecting, by a receiver system, acoustic waves corresponding to a photoacoustic response of a target object proximate the first area of the platen, to the light emitted by the first light-emitting component. In an example implementation, block 1110 may involve detecting by the receiver system 202, acoustic waves corresponding to a photoacoustic response of the target object 362 to the light emitted by the light-emitting component 210 (the VCSEL 355, for example).

Block 1115 involves shielding the receiver system from at least some electromagnetic interference (EMI) produced by light source system circuitry, wherein the first light guide component is configured to transmit light from the first light-emitting component to the first area of the platen through a first EMI shield portion. In an example implementation, block 1115 may involve shielding the receiver system 202 from at least some EMI produced by the light source system circuitry 211. The light guide component 205 may be configured to transmit light from the light-emitting component 210 to the first area of the platen through a first portion of the EMI shield 203.

Implementation examples are described in the following numbered clauses:

1. An apparatus, comprising a platen; a light source system including light source system circuitry, at least a first light-emitting component and at least a first light guide component, the first light-emitting component configured to provide light to a first area of the platen via the first light guide component, the first light guide component having a substantially uniform cross-section; a receiver system including at least two receiver stack portions, a first receiver stack portion residing proximate a first side of the first light guide component and a second receiver stack portion residing proximate a second side of the first light guide component, the receiver system being configured to detect acoustic waves corresponding to a photoacoustic response of a target object proximate the first area of the platen to light emitted by the light source system; and an electromagnetic interference (EMI) shield configured to shield the receiver system from at least some of the EMI produced by the light source system circuitry, wherein the first light guide component is configured to transmit light from the first light-emitting component through a first EMI shield portion to the first area of the platen.

2. The apparatus of clause 1, wherein the first receiver stack portion resides proximate a second area of the platen on a first side of the first area and wherein the second receiver stack portion resides proximate a third area of the platen on a second and opposite side of the first area.

3. The apparatus of any one of clause 1 or clause 2, wherein the first receiver stack portion and the second receiver stack portion are portions of a first receiver stack ring.

4. The apparatus of clause 3, wherein the first receiver stack ring is configured to surround the first portion of the first light guide component.

5. The apparatus of any one of clauses 1-4, further comprising a backing layer residing between the EMI shield and the at least two receiver stack portions, wherein the backing layer has a thickness of two millimeters or less.

6. The apparatus of any one of clauses 1-4, wherein the apparatus includes no backing layer residing between the EMI shield and the at least two receiver stack portions.

7. The apparatus of clause 6, further comprising a control system configured to apply one or more types of signal processing to receiver system signals to cancel noise resulting from having no backing layer.

8. The apparatus of any one of clauses 1-7, wherein the first light-emitting component comprises a multi-junction vertical cavity surface-emitting laser or an edge-emitting laser.

9. The apparatus any one of clauses 1-8, wherein the apparatus has an overall thickness, along an axis parallel to the first light guide component or an axis perpendicular to the platen, of between 3 and 6 millimeters.

10. The apparatus any one of clauses 1-9, wherein the receiver system includes an array of ultrasonic receiver elements.

11. The apparatus of clause 10, further comprising a control system configured to apply a receiver-side beamforming process to receiver system signals, to produce a beamformed image.

12. The apparatus of clause 11, wherein the control system is configured to detect a blood vessel within the target object based, at least in part, on the beamformed image.

13. The apparatus of clause 12, wherein the control system is further configured to estimate one or more blood vessel features based, at least in part, on the beamformed image.

14. The apparatus of clause 13, wherein the one or more blood vessel features include blood vessel diameter, blood vessel area, blood vessel profile, blood vessel distention, volumetric flow, pulse wave velocity, blood vessel wall thickness, or combinations thereof.

15. The apparatus of clause 13, wherein the control system is further configured to estimate blood pressure based, at least in part, on the one or more blood vessel features.

16. The apparatus of clause 10, wherein the receiver system includes a linear array of receiver stack portions.

17. The apparatus of clause 10, wherein the receiver system includes a two-dimensional array of receiver stack portions.

18. The apparatus any one of clauses 1-17, wherein the light source system includes at least a second light-emitting component and at least a second light guide component, the second light-emitting component configured to provide light to a second area of the platen via the second light guide component, the second light guide component being configured to transmit light from the second light-emitting component through a second EMI shield portion to the second area of the platen.

19. The apparatus any one of clauses 1-17, wherein the light source system includes second through Nth light-emitting components and second through Nth light guide components, the second through Nth light-emitting components configured to provide light to second through Nth areas of the platen via corresponding instances of the second through Nth light guide components, the second through Nth light guide components being configured to transmit light from corresponding instances of the second through Nth light-emitting components through second through Nth EMI shield portions to the second through Nth areas of the platen.

20. A method comprising causing a first light-emitting component to provide light to a first area of a platen via a first light guide component that has a substantially uniform cross-section; detecting, by a receiver system, acoustic waves corresponding to a photoacoustic response of a target object proximate the first area of the platen, to the light emitted by the first light-emitting component; and shielding the receiver system from at least some electromagnetic interference (EMI) produced by light source system circuitry, wherein the first light guide component is configured to transmit light from the first light-emitting component to the first area of the platen through a first EMI shield portion.

21. The method of clause 20, further comprising applying one or more types of signal processing to receiver system signals to cancel noise resulting from having no backing layer residing between the receiver system and an EMI shield that shields the receiver system from the at least some EMI produced by the light source system circuitry.

22. The method any one of clauses 20-21, further comprising applying a receiver-side beamforming process to receiver system signals, to produce a beamformed image.

23. The method of clause 22, further comprising detecting a blood vessel within the target object based, at least in part, on the beamformed image.

24. The method of any one of clauses 22 or 23, further comprising estimating one or more blood vessel features based, at least in part, on the beamformed image.

25. The method of clause 24, wherein the one or more blood vessel features include blood vessel diameter, blood vessel area, blood vessel profile, blood vessel distention, volumetric flow, pulse wave velocity, blood vessel wall thickness, or combinations thereof.

26. The method of clause 24, further comprising estimating blood pressure based, at least in part, on the one or more blood vessel features.

27. An apparatus comprising means for causing a first light-emitting component to provide light to a first area of a platen via a first light guide component that has a substantially uniform cross-section; means for detecting acoustic waves corresponding to a photoacoustic response of a target object proximate the first area of the platen, to the light emitted by the first light-emitting component; and means for shielding a receiver system from at least some electromagnetic interference (EMI) produced by light source system circuitry, wherein the first light guide component is configured to transmit light from the first light-emitting component to the first area of the platen through a first EMI shield portion.

28. The apparatus of clause 27, further comprising means for applying one or more types of signal processing to receiver system signals to cancel noise resulting from having no backing layer residing between the receiver system and an EMI shield that shields the receiver system from the at least some EMI produced by the light source system circuitry.

29. The apparatus of any one of clauses 27-28, further comprising means for applying a receiver-side beamforming process to receiver system signals, to produce a beamformed image.

30. The apparatus of clause 29, further comprising means for estimating one or more blood vessel features based, at least in part, on the beamformed image.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

Various modifications to the implementations described in this disclosure may be readily apparent to those skilled in the art, and the generic principles defined herein may be applied to other implementations without departing from the spirit or scope of this disclosure. Thus, the following claims are not intended to be limited to the implementations shown herein, but are to be accorded the widest scope consistent with this disclosure, the principles and the novel features disclosed herein.

Additionally, certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. Moreover, various ones of the described and illustrated operations can itself include and collectively refer to a number of sub-operations. For example, each of the operations described above can itself involve the execution of a process or algorithm. Furthermore, various ones of the described and illustrated operations can be combined or performed in parallel in some implementations. Similarly, the separation of various system components in the implementations described above should not be understood as requiring such separation in all implementations. As such, other implementations are within the scope of the following claims. In some cases, the actions recited in the claims can be performed in a different order and still achieve desirable results.

What is claimed is:

1. An apparatus, comprising:
   a platen;
   a light source system including light source system circuitry, at least a first light-emitting component and at least a first light guide component, the first light-emitting component configured to provide light to a first area of the platen via the first light guide component, the first light guide component having a cross-section in the range of 0.25 millimeters to 3 millimeters with less than a 10 percent variation, the first light guide component extending from the first light-emitting component to the platen over a length of less than 8 millimeters;
   a receiver system including at least two receiver stack portions, a first receiver stack portion residing proximate a first side of the first light guide component and a second receiver stack portion residing proximate a second side of the first light guide component, the receiver system being configured to detect acoustic waves corresponding to a photoacoustic response of a target object proximate the first area of the platen to light emitted by the light source system; and
   an electromagnetic interference (EMI) shield configured to shield the receiver system from at least some of the EMI produced by the light source system circuitry, wherein the first light guide component is configured to transmit light from the first light-emitting component through a first EMI shield portion to the first area of the platen.

2. The apparatus of claim 1, wherein the first receiver stack portion resides proximate a second area of the platen on a first side of the first area and wherein the second receiver stack portion resides proximate a third area of the platen on a second and opposite side of the first area.

3. The apparatus of claim 1, wherein the first receiver stack portion and the second receiver stack portion are portions of a first receiver stack ring.

4. The apparatus of claim 3, wherein the first receiver stack ring is configured to surround the first portion of the first light guide component.

5. The apparatus of claim 1, further comprising a backing layer residing between the EMI shield and the at least two receiver stack portions, wherein the backing layer has a thickness of two millimeters or less.

6. The apparatus of claim 1, wherein the apparatus includes no backing layer residing between the EMI shield and the at least two receiver stack portions.

7. The apparatus of claim 6, further comprising a control system configured to apply one or more types of signal processing to receiver system signals to cancel noise resulting from having no backing layer.

8. The apparatus of claim 1, wherein the first light-emitting component comprises a multi-junction vertical cavity surface-emitting laser or an edge-emitting laser.

9. The apparatus of claim 1, wherein the apparatus has an overall thickness, along an axis parallel to the first light guide component or an axis perpendicular to the platen, of between 3 and 6 millimeters.

10. The apparatus of claim 1, wherein the receiver system includes an array of ultrasonic receiver elements.

11. The apparatus of claim 10, further comprising a control system configured to apply a receiver-side beamforming process to receiver system signals, to produce a beamformed image.

12. The apparatus of claim 11, wherein the control system is configured to detect a blood vessel within the target object based, at least in part, on the beamformed image.

13. The apparatus of claim 12, wherein the control system is further configured to estimate one or more blood vessel features based, at least in part, on the beamformed image.

14. The apparatus of claim 13, wherein the one or more blood vessel features include blood vessel diameter, blood vessel area, blood vessel profile, blood vessel distention, volumetric flow, pulse wave velocity, blood vessel wall thickness, or combinations thereof.

15. The apparatus of claim 13, wherein the control system is further configured to estimate blood pressure based, at least in part, on the one or more blood vessel features.

16. The apparatus of claim 10, wherein the receiver system includes a linear array of receiver stack portions.

17. The apparatus of claim 10, wherein the receiver system includes a two-dimensional array of receiver stack portions.

18. The apparatus of claim 1, wherein the light source system includes at least a second light-emitting component and at least a second light guide component, the second light-emitting component configured to provide light to a second area of the platen via the second light guide component, the second light guide component being configured to transmit light from the second light-emitting component through a second EMI shield portion to the second area of the platen.

19. The apparatus of claim 1, wherein the light source system includes second through $N^{th}$ light-emitting components and second through $N^{th}$ light guide components, the second through $N^{th}$ light-emitting components configured to provide light to second through $N^{th}$ areas of the platen via corresponding instances of the second through $N^{th}$ light guide components, the second through $N^{th}$ light guide components being configured to transmit light from corresponding instances of the second through $N^{th}$ light-emitting components through second through $N^{th}$ EMI shield portions to the second through $N^{th}$ areas of the platen.

20. The apparatus of claim 1, wherein the apparatus is a wearable apparatus.

21. The apparatus of claim 20, wherein the wearable apparatus is a watch, a patch or an ear bud.

22. A method, comprising:
    causing a first light-emitting component to provide light to a first area of a platen via a first light guide component that has a cross-section in the range of 0.25 millimeters to 3 millimeters with less than a 10 percent variation, the first light guide component extending from the first light-emitting component to the platen over a length of less than 8 millimeters;
    detecting, by a receiver system, acoustic waves corresponding to a photoacoustic response of a target object proximate the first area of the platen, to the light emitted by the first light-emitting component; and
    shielding the receiver system from at least some electromagnetic interference (EMI) produced by light source system circuitry, wherein the first light guide component is configured to transmit light from the first light-emitting component to the first area of the platen through a first EMI shield portion.

23. The method of claim 22, further comprising:
    applying one or more types of signal processing to receiver system signals to cancel noise resulting from having no backing layer residing between the receiver system and an EMI shield that shields the receiver system from the at least some EMI produced by the light source system circuitry.

24. The method of claim 22, further comprising:
applying a receiver-side beamforming process to receiver system signals, to produce a beamformed image.

25. The method of claim 24, further comprising:
detecting a blood vessel within the target object based, at least in part, on the beamformed image.

26. The method of claim 24, further comprising:
estimating one or more blood vessel features based, at least in part, on the beamformed image.

27. The method of claim 26, wherein the one or more blood vessel features include blood vessel diameter, blood vessel area, blood vessel profile, blood vessel distention, volumetric flow, pulse wave velocity, blood vessel wall thickness, or combinations thereof.

28. The method of claim 26, further comprising:
estimating blood pressure based, at least in part, on the one or more blood vessel features.

* * * * *